(12) United States Patent
Manina et al.

(10) Patent No.: US 12,473,581 B2
(45) Date of Patent: Nov. 18, 2025

(54) MULTIPLEXABLE MICROFLUIDIC CULTURE CHAMBER FOR IMAGING MONOLAYER GROWTH OF SINGLE CELLS

(71) Applicant: INSTITUT PASTEUR, Paris (FR)

(72) Inventors: Giulia Manina, Paris (FR); Maxime Mistretta, Paris (FR)

(73) Assignee: INSTITUT PASTEUR, Paris (FR)

( * ) Notice: Subject to any disclaimer, the term of this patent is extended or adjusted under 35 U.S.C. 154(b) by 786 days.

(21) Appl. No.: 17/603,787

(22) PCT Filed: May 14, 2020

(86) PCT No.: PCT/EP2020/063532
§ 371 (c)(1),
(2) Date: Oct. 14, 2021

(87) PCT Pub. No.: WO2020/229629
PCT Pub. Date: Nov. 19, 2020

(65) Prior Publication Data
US 2022/0195486 A1    Jun. 23, 2022

(30) Foreign Application Priority Data
May 14, 2019  (EP) ..................... 19305617

(51) Int. Cl.
*C12Q 1/18*   (2006.01)
*B01L 3/00*   (2006.01)
(Continued)

(52) U.S. Cl.
CPC .......... *C12Q 1/18* (2013.01); *B01L 3/502715* (2013.01); *C12M 23/22* (2013.01);
(Continued)

(58) Field of Classification Search
CPC ................ C12Q 1/18; B01L 3/502715; B01L 2200/0684; B01L 2300/0654;
(Continued)

(56) References Cited

U.S. PATENT DOCUMENTS

| | | |
|---|---|---|
| 2009/0221073 A1 | 9/2009 | Toner et al. |
| 2013/0203634 A1 | 8/2013 | Jovanovich et al. |
| 2016/0017271 A1 * | 1/2016 | Nozaki ................. C12M 23/48 422/561 |

FOREIGN PATENT DOCUMENTS

WO    WO-2014144789 A2 *  9/2014   ........ B01L 3/502738

OTHER PUBLICATIONS

Kim et al., A programmable microfluidic cell array for combinatorial drug screening, Lab Chip, 2012, 12, 1813-1822.

* cited by examiner

*Primary Examiner* — Kathryn Elizabeth Limbaugh
(74) *Attorney, Agent, or Firm* — ARRIGO, LEE GUTTMAN & MOUTA-BELLUM LLP

(57) ABSTRACT

Multiplexable microfluidic culture chamber for imaging monolayer growth of single cells The present invention relates generally to a microfluidic device (1a, 1b), particularly for use in single cell analysis. More specifically, the present invention relates to a microfluidic device (1a, 1b) comprising at least one chamber (10), in particular at least two chambers (10) comprising a deformable membrane (16) and having a structure and geometry configured to enable formation of two-dimensional cell culture, in particular two-dimensional cell growth area (29), and imaging thereof over a growth period or a time period sufficient to analyze cells, in particular to monitor cell growth. The microfluidic device (1a, 1b) allows for multi-condition operation of (Continued)

single-cell screening at high spatiotemporal resolution. The present invention also relates to methods for fabrication and use of such devices.

19 Claims, 9 Drawing Sheets

(51) Int. Cl.
*C12M 1/00* (2006.01)
*C12M 1/34* (2006.01)
*C12N 1/20* (2006.01)

(52) U.S. Cl.
CPC ............ *C12M 23/34* (2013.01); *C12M 41/36* (2013.01); *C12N 1/20* (2013.01); *B01L 2200/0684* (2013.01); *B01L 2300/0654* (2013.01); *B01L 2400/0655* (2013.01)

(58) Field of Classification Search
CPC ........... B01L 2400/0655; C12M 23/22; C12M 23/34; C12M 1641/36; C12N 1/20
See application file for complete search history.

Fig. 3C
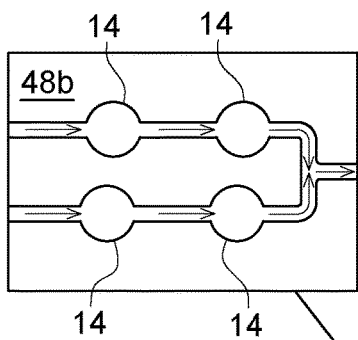
Fig. 3D
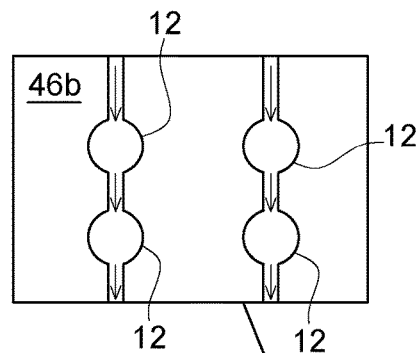
Fig. 3A
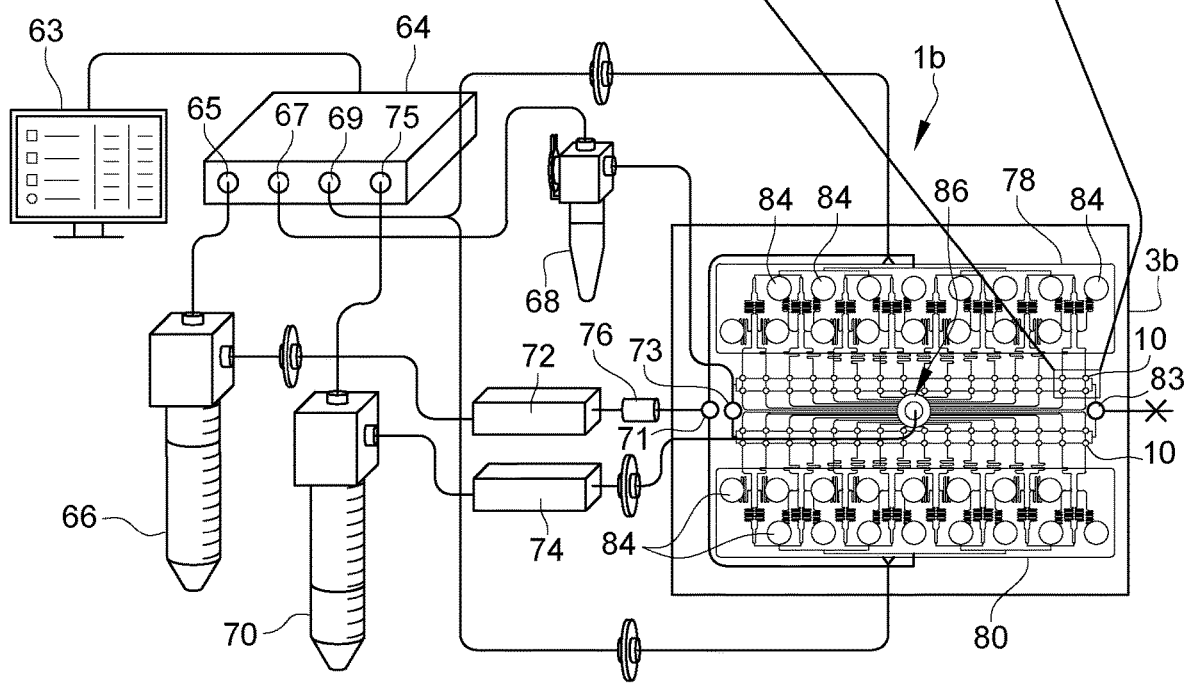
Fig. 3B

Fig. 4A
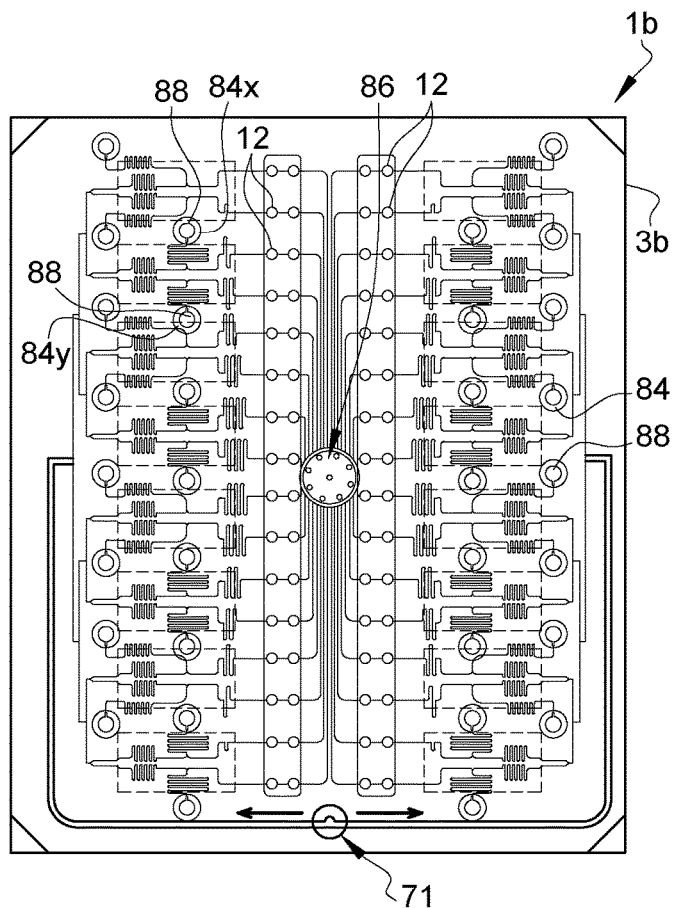
Fig. 4B
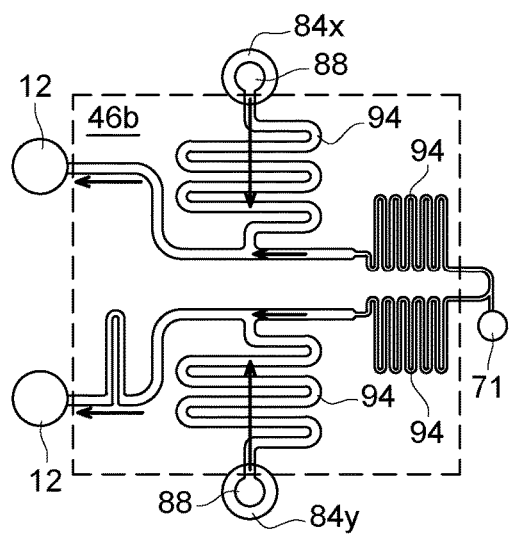
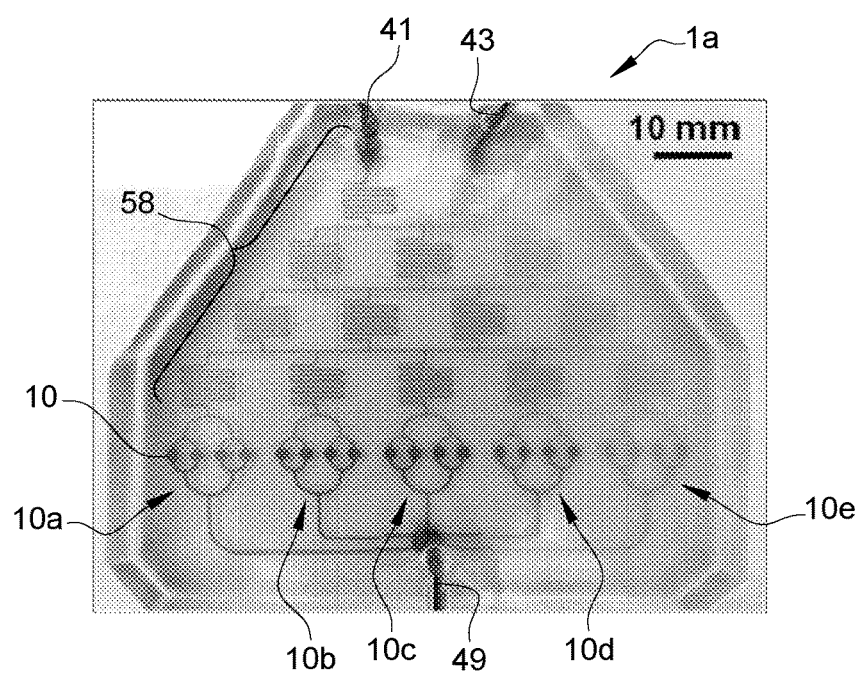
Fig. 5

MULTIPLEXABLE MICROFLUIDIC CULTURE CHAMBER FOR IMAGING MONOLAYER GROWTH OF SINGLE CELLS

FIELD OF THE INVENTION

The present invention relates generally to a microfluidic device, particularly for use in single cell analysis. More specifically, the present invention relates to a microfluidic device comprising at least one chamber, in particular at least two chambers comprising a deformable membrane and having a structure and geometry configured to enable formation of two-dimensional cell culture, in particular two-dimensional cell growth area, and imaging thereof over a growth period or a time period sufficient to analyze cells, in particular to monitor cell growth. The microfluidic device allows for multi-condition operation of single-cell screening at high spatiotemporal resolution. The present invention also relates to methods for fabrication and use of such devices.

BACKGROUND OF THE INVENTION

Analysis and observation of cells, including imaging, in particular cell screening, study of cell growth, cell behavior or cell differentiation, are generally performed by reference to target average cell population.

Accordingly, conventional drug-screening approaches are designed to target average cell population and are subject to overly stringent criteria, which overlook molecules that can act on the single-cell and subpopulation scale. Moreover, data obtained by averaging the cell-population behavior and without temporal tracking mask the specific contribution of individual cells to the whole population dynamics and limit biomedical research and development.

Profound understanding of the biology of the cell, whether prokaryotic or eukaryotic, requires dissection of its dynamics at the individual level. Studying the spatiotemporal dynamics of the single-cell physiology not only provides new mechanistic insights into the biology of the cells, but also enables the conception of original strategies for targeting and manipulating the cellular behavior, aiming to tackle both communicable and non-communicable diseases.

Studying single cells as opposed to the average cell population thus provides a more comprehensive understanding of the physiology of the cell population, and is critical for the development of improved therapeutics and diagnostics (Marusyk and Polyak, 2010; Ackermann, 2015). However, the analysis of individual cells requires the implementation of cutting-edge technologies that capture behavior of cells with high spatial and temporal resolution. Several approaches can be used to probe cell-to-cell heterogeneity. For instance, flow cytometry acquires quantitative measurements of thousands of individual cells, generating snapshots of a population at given time points (Adan et al., 2017). Flow cytometry can also be associated to downstream analysis and more recently it has been coupled to imaging (Basiji, 2016). Although flow cytometry is a robust technique widely used in clinics for diagnostics, it cannot track the dynamics of the same cell over time, which represents a major limitation in its application. Assays using different types of commercialized multi-well plates, whose bottom is transparent and suitable for imaging and the surface functionalized to confine cells, limit the study of phenotypic variation to a static environment for short time scales, without providing insights into the dynamics of this phenomenon (Thery, 2010; Silva et al., 2015; Wallberg et al., 2016).

Cell phenotypic heterogeneity can be effectively studied using long-term time-lapse fluorescence microscopy, which requires customized platforms suitable for cellular growth and tunable turnover of growth medium (Muzzey et al., 2009). Microsystem microfluidics in conjunction with fluorescent reporter strains and time-lapse imaging proved useful to study phenotypic heterogeneity both qualitatively and quantitatively, by probing the behavior of individual cells under tight environmental control over time (Locke and Elowitz, 2009; Ackermann, 2015). Microfluidic systems compatible with living organisms are built by a combination of microfabrication techniques that transfer 3D microstructures, such as channels and chambers, to a silicone elastomer bound to glass, generating fluidic networks at the sub-millimeter scale. Within these systems the culture medium circulates in a constant and controlled manner and, thanks to their optical compatibility, cell growth can be monitored at high spatiotemporal resolution (Rusconi et al., 2014). An essential requirement for time-lapse microfluidic microscopy is to ensure homogeneous cell growth throughout the imaging area by preventing overlaps between cells, which would affect data acquisition, and by avoiding phototoxicity. These needs apply to both eukaryotic cells, which have a size in the order of tens of microns, and prokaryotic cells, whose minor axis has a size below one micron. To this end, two possible but imperfect solutions have been proposed. The first is to acquire stacks of images on the z-plane, which conversely causes phototoxicity and is not feasible in the long run. The second is to reduce the focal plane, by forcing the cells to grow on a two-dimensional plane using either agar pads, which is incompatible with long-term imaging and multi-condition, or physical constraints, which are less compatible with cell viability (Young et al., 2011; Joice et al., 2011; Golchin et al., 2012; Dhar and Manina, 2015; Shi et al., 2017; Schmidt et al., 2018).

The CellASIC ONIX system commercialized by MERK is based on the physical containment of cells and can test four environmental conditions at a time. Cells are trapped in round chambers, whose roof is made of elastomer that can be deformed proportionally to the speed of the flow used to inject the cells. When the flow is slowed down the roof returns to its initial position trapping the underlying cells. Besides its very low throughput, the main drawback of CellASIC ONIX is that the minimum height of the culture area is 0.7 µm, which is far too wide to immobilize individual bacterial cells as monolayers in an efficient and durable manner, especially considering most bacterial pathogens measure less than 0.5 µm in their shortest axis, making long-term single-cell imaging very challenging with this system.

Quake valves consist of two microchannels made of elastomer and superposed perpendicularly, whose membrane at the intersection between the two channels is deformable. The pressure of the flow in the upper channel makes it possible to modulate the deformation of the membrane so as to close the lower channel more or less, in particular completely. Such a crossed-channel architecture is disclosed in an article published in 2000 by Unger et al. with the title "Monolithic Microfabricated Valves and Pumps by Multilayer Soft Lithography" published in "Science" in Volume 288 on pages 113-116. Pneumatic actuation of the valve disclosed therein is dependent on the shape of the flow channel and the pressure applied to the control channel. Such a valve is thus useful for microfluidic metering and flow control.

An article published in 2012 by Kim et al. with the title "A microfluidic device for high throughput bacterial biofilm studies" published in "Lap Chip" in Volume 12 on pages 1157-1163 discloses a PDMS-based two layer microfluidic flow cell comprising a bottom layer with a diffusion gradient and eight microchambers and a top layer with the pneumatic elements for opening and closing microvalves that separate the diffusive mixer and bacteria seeding ports from the microchambers.

An article published in 2012 by Kim et al. with the title "A programmable microfluidic cell array for combinatorial drug screening" published in "Lap Chip" in Volume 12 on pages 1813-1822 discloses a programmable microfluidic cell culture array consisting of two PDMS layers—a fluidic network layer containing the fluidic channels required for generating different concentrations of drug molecules and the cell culture chambers, and a rim-shaped pneumatic layer for controlling fluid access to cell culture chamber. The chamber region can be either isolated or exposed to fluid by lowering or raising a microchamber using a pneumatic source.

However, the above-described pneumatic microfluidic valves are commonly used to transit 'from open to close' and 'from closed to open' configurations, aiming to prevent the passage of fluids and/or to act as pumping valves to redirect fluids. Moreover, existing microfluidic valves operate at very high pressures, i.e., 0.35-3.5 Bars, which are incompatible with both cells trapping and viability.

Microfluidic systems adapted to cell growth can be broadly divided into channel-based and droplet-based microfluidics (Bai et al., 2018). While the former provides higher resolution and environmental flexibility at low throughput, the latter provides lower resolution and environmental flexibility at higher throughput. Although different types of microfluidic platforms have been built for the purpose of single-cell analysis and screening (Du et al., 2016), none of them can manipulate different cell types, keep cells in culture steadily on a two-dimensional plane for long periods of time, and test several environmental conditions while fulfilling the previous conditions.

Moreover, existing technologies address only one or at most two of the following technical issues at a time: single-cell tracking, long-term imaging and screening applications. Therefore, there needs a system that bridges the gaps among all of these aspects, breaking the boundaries of the state of the art and generating a new paradigm of cellular investigation.

DESCRIPTION OF THE INVENTION

Accordingly, an object of this invention is to provide a microfluidic device that merges the best qualities of both channel-based and droplet-based systems, which can manipulate different cell types, keep cells in culture steadily on a two-dimensional plane, e.g., as a monolayer, as two-dimensional colony forming unit (CFU) or any other two-dimensional structures, for sufficient periods of time to enable relevant data recovery and test several environmental conditions while providing high throughput screening assays at high resolution and environmental flexibility.

Another object of this invention is to provide a microfluidic device designed to maintain optimal control of fluids, avoid contamination between independent chambers, and ensure stable cell growth in two-dimensional plane to enable cell study, in particular at the single-cell level.

The present invention differs from the Quake valve systems in that the invention maintains a liquid layer or liquid flow in the culture chamber instead of creating a static chamber environment by closing the chamber completely. In addition, the invention concerns substantially larger surface of deformation of the membrane than that used in the Quake valve systems.

The inventors have surprisingly found that the particular structure and geometry of the microfluidic chamber, which comprises a membrane arranged to divide said microfluidic chamber into two compartments, make it possible to achieve high system stability and homogeneous cell culture in two-dimensional structures, such as monolayers, from a few hours up to several days with a substantially lower pressure exerted on the membrane compared with other microfluidic devices employing a pneumatic valve model, which require high operating pressures and thus are incompatible with cell survival and growth.

The present invention provides a microfluidic device for culturing of cells, either eukaryotic or prokaryotic cells, in particular for culturing bacterial colonies in two-dimensions, e.g., to capture monolayers of cells or to capture CFU in conditions which allow cell observation by a microscope, in particular by a wide-field fluorescence microscope, for an extended period of time, e.g., at least 24 hours to 14 days. The device of the invention advantageously enables single cell observation.

The inventors have discovered that the microfluidic device according to the invention is suitable for manipulating different cell types, in particular culturing organisms of different sizes. For example, it has been demonstrated that the invention provides a microfluidic system that is flexible enough to be adapted to the culture and growth of bacteria of a size over 5 µm in length and over 0.5 µm in width such as *Mycobacterium smegmatis* (having a length of about 7 µm and a width of about 0.7 µm) and bacteria of smaller size under 5 µm in length and under 0.5 µm in width such as *Mycobacterium tuberculosis* (having a length of about 4 µm and a width of about 0.4 µm), on a two-dimensional plane, including for culture over several days.

In particular, the inventors have developed a robust microfluidic module (FIG. 1) that enables to track the dynamics of individual cells at high spatial and temporal resolution, i.e., on a two-dimensional area over long periods of time. Furthermore, the microfluidic module can be multiplexed and/or integrated with additional features as per need (FIGS. 2-6), making it is also suitable for time-resolved single-cell screening applications. The robustness and flexibility of the microfluidic module make it ideal for high-throughput applications and temporal tracking of live individual cells, spanning a broad size range (e.g., from 0.3 µm to 50 µm), up to several weeks, and also under high-level of biocontainment (FIGS. 7-11). In contrast to existing and/or commercial single-cell tools, the microfluidic module according to the invention has been created to carry out both short- and long-term single-cell imaging of very small-sized to very large-sized cell types, under multiple conditions at once, and also working in Biosafety Level 3 labs (FIGS. 10 and 11). In the Example 13, the adaptation of the 5-condition platform is described for its safe use to image *Mycobacterium tuberculosis*, which is a slowly-growing Biosafety Level 3 pathogen and very small in size (average thickness of 0.4 µm). Remarkably, the inventors were able to carry out stable monolayer single-cell live-imaging of *Mycobacterium tuberculosis* for up to 10 consecutive days (FIG. 11).

The invention provides a fine-tunable microfluidic module having a narrow working space, which is compatible with long-term cell viability, as opposed to the so-called pneumatic microfluidic valves. The microfluidic module (culture chamber) operates exclusively within a restricted combination of parameters that are essential and peculiar to the microfluidic culture chamber. In particular, measures or dimensions pertaining to the diameter and height of the lower compartment and their ratio, the thickness of the membrane, the ratio between the thickness of the membrane and the height of the lower chamber, the ratio between the diameter of the culture chamber to the width of the lower inlet and outlet channels, the ratio between the diameters of the upper and the lower compartments, and/or the pressure required to lower the membrane are specific to the working principle of the microfluidic culture chamber of the invention, and are detailed in Examples 15 and 16. In contrast to existing microfluidic valves, which are actuated at very high pressures (0.35-3.5 Bar), the microfluidic device according to the invention operates at lower pressures (0.015-0.050 Bar), specifically targeting a semi-closed state of the membrane (FIG. 12), which can be achieved exclusively within a relatively narrow working space. The gentle lowering of the membrane onto the third element on the one hand, enables the trapping of individual cells within the 2D area, and on the other hand, leads to the formation of a nanolayer of cell-growth liquid medium, which recirculates and provides the nutrients and humidity required for cell viability and growth (FIGS. 12 and 13). As clearly shown in FIG. 13, a moderate increase (0.05 Bar) in the pressure of the flow in upper channel ($P_{CTRL}$) leads to the disruption of the liquid nanolayer, and to a direct contact between the membrane and the glass, which, in other words, generates a closed configuration that is incompatible with cell viability and growth.

The herein disclosed microfluidic device not only enables multi-scale fundamental study of cellular diversity, growth and transformation, but also opens up new venues in diagnostics and therapeutics. The present invention is, for example, relevant in the context of the global tuberculosis epidemic and the study of other infections. It is also relevant in the study, diagnosis or monitoring of other diseases characterized by pronounced cellular variation, in particular phenotype variations or variations that can be unveiled by markers, such as cancer, neurodegenerative, or neuromuscular diseases.

The microfluidic device according to the invention has many different applications including, but not limited to, the study of phenotypic variations at the single-cell level, such as formation of persistent subpopulations, the screening of markers expressed at a cellular level, the screening for compounds for their activity, including compounds with new mechanisms of action, and the original drug discovery strategies aimed at hampering phenotypic variation.

Other possible applications include screening of various mutant libraries (e.g., CRISPR, RNAi, etc.), live immunostaining, super-resolution imaging on live cells, and eukaryotic cell variation and differentiation (e.g., in cancer detection or monitoring, or in developmental biology).

The present invention thus relates to a microfluidic device comprising a body comprising a lower fluidic network, an upper fluidic network, and at least one cell culture chamber, in particular at least two cell culture chambers, wherein the at least one cell culture chamber, in particular at least two cell culture chambers, is a disc-shaped chamber and comprises:

a. a lower compartment connected to a lower inlet channel and a lower outlet channel, wherein said lower compartment, said lower inlet channel, and said lower outlet channel are comprised in said lower fluidic network;

b. an upper compartment connected to an upper inlet channel and an upper outlet channel, wherein said upper compartment, said upper inlet channel, and said upper outlet channel are comprised in said upper fluidic network; and c. a deformable membrane disposed between the lower compartment and the upper compartment, wherein the membrane constitutes a top surface of the lower compartment and a bottom surface of the upper compartment, wherein the lower compartment and the upper compartment have a disc-shaped geometry that enables homogeneous actuation of the membrane;

wherein the diameter of the lower compartment is greater than the height of the lower compartment;

wherein the height of the upper compartment is greater than or equal to the height of the lower compartment;

wherein the diameter of the upper compartment, is greater than the width of the upper inlet channel and the width of the upper outlet channel;

wherein the largest distance between the two opposite points on the geometry of the lower compartment, in particular the diameter of the lower compartment, is greater than the width of the lower inlet channel and the width of the lower outlet channel;

wherein the ratio of the diameter of the lower compartment to the width of the lower inlet channel is from 2 to 5, in particular 3.5, and the ratio of the diameter of the lower compartment to the width of the lower outlet channel is from 2 to 5, in particular 3.5; and wherein the ratio of the diameter of the lower compartment to the height of the lower compartment is from 15 to 100, in particular from 15 to 30.

As used herein the term "body" denotes the main part of the microfluidic device, which comprises or contains at least one fluidic network and at least one chamber, in particular at least two chambers, used for cell seeding and culture. Each chamber is divided vertically into a lower compartment and an upper compartment by a membrane positioned within the chamber.

In a particular embodiment, the microfluidic device according to the invention comprises at least two cell culture chambers.

The membrane has a first face and a second face. The first face of said membrane constitutes the bottom surface of the upper compartment and the second face of said membrane constitutes the top surface of the lower compartment.

The shape of the chamber is a circle when viewed from the top or bottom of the device, that is, the 3-dimensional shape of the upper and the lower compartments is a disc. Whatever its shape, the chamber is suitable for holding fluids and/or cells and possibly for enabling the circulation of said fluids and/or cells.

The disc-shaped geometry of the chamber facilitates homogeneous deformation of the membrane and enables uniform distribution of force when pressure is applied to a fluid reservoir connected to the upper compartment and exerted on said membrane, thereby significantly improving the stability of the system. Furthermore, the disc-shaped geometry of the chamber keeps the interface between the membrane and the bottom surface of the lower compartment stable, even if the flow rate of a liquid in the lower compartment changes.

Advantageously, the lower and the upper compartments have a disc-shaped geometry, wherein the lower compartment has a diameter greater than or equal to the diameter of the upper compartment. The greater diameter of the lower compartment compared to that of the upper compartment facilitates the device fabrication. The membrane, the upper compartment, and the lower compartment advantageously have the same shape as the shape of the chamber.

Other advantageous shapes for the chamber, the upper compartment, the lower compartment, and/or the membrane are those that minimize, in particular, the angles present at the level of the membrane, i.e., on the top surface of the lower compartment and the bottom surface of the upper compartment. In this regard, the disc shape geometry provides the best potential.

In an embodiment where the body comprises a plurality of chambers, in particular two chambers, the minimum distance between two neighboring chambers is 200 µm. The distance between two chambers prevents inadvertent infiltration of a fluid liquid or cells between the bottom surfaces of the lower compartments or contamination between the chambers through the wall between the chambers. It may also prevent optical interference between different chambers. A particular example of such distance between two neighboring chambers is 500 µm.

The body further comprises two vertically stacked fluidic networks, i.e., the lower fluidic network and the upper fluidic network. The lower fluidic network fluidically connects at least one lower inlet port to at least one lower outlet port, in particular to one lower outlet port, and fluidically passes through at least one lower compartment, preferably all lower compartments. The lower fluidic network thus comprises at least one lower inlet channel and at least one lower outlet channel connected to said at least one lower compartment.

As used herein, the term "fluidically connected" or "fluidically passing through" means that a channel, in particular a microchannel, physically connecting at least two points of the body is configured so as to create a fluid passage by allowing a fluid to flow in the direction from the inlet port to the outlet port of the device.

In a particular embodiment, the lower fluidic network fluidically connects at least 17 lower inlet ports or any multiple of 16 plus 1, for example 17, 33, 49, or 65 lower inlet ports, to at least one lower outlet port. Each of the lower inlet ports is fluidically connected to at least one lower compartment, or to at least two lower compartments, and said at least one lower compartment or said at least two lower compartments is(are) connected to at least one lower outlet port. In such embodiment, the lower compartments connected to a common lower inlet port are fluidically connected, in particular in series, and all lower compartments comprised in the body may be connected to a common outlet port. The lower compartments connected to different lower inlet ports are not fluidically connected. In an embodiment where the body comprises 17 lower inlet ports, the total number of chambers is at least 16, preferably 32, or any multiple of 16, for example, 16, 32, 48, 64, 96 or 128.

The upper fluidic network fluidically connects at least one upper inlet port, in particular one upper inlet port, to at least one upper outlet port, in particular to one upper outlet port and passes through at least one upper compartment, preferably all upper compartments. The upper fluidic network thus comprises at least one upper inlet channel and at least one upper outlet channel connected to said at least one upper compartment. According to the embodiments of the invention, the upper fluidic network and the lower fluidic network do not join each other to the extent that the fluid(s) in the upper fluidic network cannot migrate to the lower fluidic network and vice versa.

Preferably, the channels comprised in the upper and lower fluidic networks between the chambers, the upper compartment, or the lower compartment, have a uniform width of at least 20 µm and a uniform height of at least 10 µm.

In particular embodiments, the channels comprised in the lower fluidic network have a uniform width of 20 to 500 µm and a uniform height of 10 to 60 µm, in particular 20 to 60 µm, and the channels comprised in the upper fluidic network have a uniform width of 20 to 500 µm and a uniform height of 10 to 200 µm, in particular 100 to 200 µm. In particular embodiments, the channels comprised in the lower fluidic network and in the upper fluidic network each have a uniform width of 20 to 500 µm and said channels have a uniform height of 20 to 60 µm in the lower fluidic network and a uniform height of 100 to 200 µm in the upper fluidic network.

As used herein the term "fluidic network" refers to a microfluidic circuit fluidically connecting at least one inlet port of the device to at least one outlet port of the device, which comprises one or more channels and passes through at least one compartment, in particular all compartments. A fluidic network establishes a flow path for a fluid to pass through channel(s) and compartment(s) from an inlet port of the device to an outlet port of the device. The "lower" fluidic network refers to a flow path fluidically connecting at least one lower inlet port of the device to at least one lower outlet port of the device, which comprises one or more lower channels and passes through at least one lower compartment, in particular all lower compartments. The "upper" fluidic network refers to a flow path fluidically connecting at least one upper inlet port of the device to at least one upper outlet port of the device, which comprises one or more upper channels and passes through at least one upper compartment, in particular all upper compartments.

As used herein, the word "uniform" has its usual meaning of unchanging, constant, same or not varying throughout. As such, the term "uniform width" refers to a width that is same and unchanging throughout the microfluidic device. Similarly, the term "uniform height" refers to a height that is same and unchanging throughout the microfluidic device. In particular embodiments, the lower fluidic network is used to inject certain molecules of interest, and/or cells, for example prokaryotic cells such as bacteria or eukaryotic cells, into the lower compartment(s) and to circulate certain molecules of interest, such as cell medium, and/or molecules to be tested, in particular drug(s), and/or molecules to be used as markers of cell compartments or cell features, through the lower fluidic network at a chosen flow rate. The upper fluidic network is used to fill the upper compartment(s) with a liquid fluid and apply a pressure onto each membrane of the chamber(s) by applying pressure into a reservoir containing the liquid fluid that is connected to the inlet of the upper fluidic network via appropriate tubing, fitting(s), and connector(s). The liquid fluid may or may not circulate through the upper fluidic network. In a particular embodiment, the outlet of the upper fluidic network is closed so that the liquid fluid remains static and a pressure is applied onto each membrane of the chamber(s) by applying pressure into a reservoir containing the liquid fluid that is connected to the inlet port of the upper fluidic network via appropriate tubing, fitting(s), and connector(s).

Each inlet port of the lower fluidic network is configured to be connected to at least one reservoir containing cell suspension, in particular bacterial suspension via appropriate materials/equipment, such removable tubing, fitting(s), and connector(s). The same or different inlet of the lower fluidic network is configured to be connected to at least one reservoir containing culture medium, and/or one reservoir containing molecules to be tested, in particular drug(s), and/or at least one reservoir containing molecules to be used as markers of cell compartments or cell features. In particular embodiments, one inlet port of the lower fluidic network may be connected to an M-switch valve, which is connected to two or more reservoirs each containing different types of liquid content mentioned above at the same time (i.e., one containing cell suspension, in particular bacterial suspension and one containing molecules to be tested, in particular drug(s), and/or one containing molecules to be used as markers of cell compartments or cell features), so that the liquid content in each reservoir can be fed into the inlet port of the device at a time without being mixed with one another or contaminated. In particular embodiments, the lower fluidic network is connected to a number of inlet ports corresponding to any multiple of 16 plus 1, for example 17, 33, 49, or 65 inlet ports, and each of said inlet ports are individually connected to an independent reservoir containing molecules of interest, i.e., cell suspension, in particular bacterial suspension and one containing molecules to be tested, in particular drug(s), and/or one containing molecules to be used as markers of cell compartments or cell features. Each liquid content containing aforementioned molecules of interest in each reservoir can be fed into each inlet port of the device without a risk of different types of liquid content being mixed with one another or contaminated.

As used herein, the term "channel" refers to the structure having a width and a height smaller than its length and enabling the liquid flow or passage between chambers and between a chamber and an inlet port of the device or an outlet port of the device. The channels thus encompass the inlet and outlet channels of the upper and the lower compartments. In a particular embodiment where the device comprises at least two chambers, two lower compartments are connected by a channel comprised in the lower fluidic network and two upper compartments are connected by a channel comprised in the upper fluidic network. A channel may have any configuration including linear or curved.

Preferably, all lower compartments are connected by channels comprised in the lower fluidic network and all upper compartments are connected by channels comprised in the upper fluidic network. Thus, a fluid or fluids in the lower fluidic network can pass through all lower compartments and a fluid or fluids in the upper fluidic network can pass through all upper compartments.

As used herein, the term "lower inlet channel" refers to a part of the lower fluidic network that is fluidically connected, e.g., operably connected thanks to a shared opening, to the lower compartment through which a liquid fluid enters said lower compartment. As used herein, the term "lower outlet channel" refers to a part of the lower fluidic network that is fluidically connected, e.g., operably connected thanks to a shared opening, to the lower compartment through which a liquid fluid exits said lower compartment. Advantageously, the lower inlet channel and the lower outlet channel have the same dimensions, i.e., same width and height.

As used herein, the term "upper inlet channel" refers to a part of the upper fluidic network that is fluidically connected, e.g., operably connected thanks to a shared opening, to the upper compartment through which a liquid fluid enters said upper compartment. As used herein, the term "upper outlet channel" refers to a part of the upper fluidic network that is fluidically connected, e.g., operably connected thanks to a shared opening, to the upper compartment through which a liquid fluid exits said upper compartment. Advantageously, the upper inlet channel and the upper outlet channel have the same dimensions, i.e., same width and height.

In a particular embodiment of the invention, the lower inlet channel and the lower outlet channel are aligned along a common axis and wherein the upper inlet channel and the upper outlet channel are aligned along a common axis.

In a particular embodiment, the common axis of the lower inlet channel and the lower outlet channel is positioned perpendicular to the common axis of the upper inlet channel and the upper outlet channel.

In one embodiment, the height of the lower inlet channel is the same as the height of the lower outlet channel.

The chamber is a disc-shaped chamber and the ratio of the diameter of the chamber to the width of the inlet channel is from 2 to 5, in particular 3.5, and the ratio of the diameter of the chamber to the width of the outlet channel is from 2 to 5, in particular 3.5. Thus, in a particular embodiment the ratio of the diameter of the lower compartment to the width of the lower inlet channel is from 2 to 5, in particular 3.5, and the ratio of the diameter of the lower compartment to the width of the lower outlet channel is from 2 to 5, in particular 3.5. Similarly, in one embodiment, the ratio of the diameter of the upper compartment to the width of the upper inlet channel is from 2 to 5, in particular 3.5, and the ratio of the diameter of the upper compartment to the width of the upper outlet channel is from 2 to 5, in particular 3.5. A diameter of the lower compartment smaller than or equal to each of the width of the lower inlet channel and the width of the outlet channel may induce instability of the 2D cell growth area. The dimensions, in particular the width of the lower outlet channel and that of the upper outlet channel smaller than one-fifth of the diameter of their respective lower compartment and upper compartment may increase the risk of clogging of the outlet channel.

In each chamber of the device, the diameter of the upper compartment is greater than or equal to the diameter of the lower compartment. If the diameter of the upper compartment is smaller than the height of the lower compartment, a higher pressure is required in the upper compartment in order to generate a 2D cell growth area, which may be incompatible with the cell condition or the cell culture. On another note, the compartments of very similar sizes facilitate the fabrication of the device, in particular, the alignment of the upper compartment(s) and the lower compartment(s).

In a particular embodiment, the ratio of the diameter of the lower compartment to each of the width of the lower inlet channel and the width of the outlet channel is about 3.5 and the ratio of the diameter of the upper compartment to each of the width of the upper inlet channel and the width of the outlet channel is about 3.5, and additionally, the ratio of the diameter of the lower compartment to the height of the lower compartment is between 15 and 100, in particular 30.

As used herein, the term "chamber" denotes a cavity of a certain shape having a width or a diameter greater than the width of the channel. According to the invention, the chamber is disc shaped and divided by a membrane into two parallel and superposed disc shaped compartments, an upper compartment and a lower compartment.

As used herein, the term "compartment" denotes a part or section within a chamber having a particular function that allows, for example, a liquid fluid to circulate therethrough and/or cells to be maintained, cultured, or observed, and optionally contacted with a fluid comprising compounds to be assessed. In particular, each compartment has a different function.

As used herein, the term "disc-shaped" denotes a shape that is circular, flat, and thin. A disc-shaped chamber or disc-shaped compartment as used herein can also refer to a round chamber or round compartment having circular top and bottom surfaces and a side wall, the circular top and bottom surfaces having a diameter substantially greater than the height of the side wall.

In a particular embodiment, the lower compartment has a disc-shaped geometry having a diameter of from 100 µm to 2000 µm, preferably from 400 µm to 2000 µm, more preferably from 400 µm to 1000 µm, even more preferably 1000 µm or 500 µm.

In a particular embodiment, the upper compartment has a disc-shaped geometry having a diameter of from 100 µm to 2000 µm, preferably from 400 µm to 2000 µm, even more preferably 1100 µm or 500 µm. In a particular embodiment, the upper compartment has a disc-shaped geometry having a diameter of 1000 µm or 1100 µm.

In a particular embodiment, the lower compartment has a height of from 10 µm to 350 µm, preferably from 15 µm to 350 µm, more preferably from 10 to 60 µm or from 18 to 40 µm.

In a particular embodiment, the upper compartment has a height of at least 100 µm, preferably from 100 to 200 µm. The height of the upper compartment may be at most ten times greater than the height of the lower compartment.

In a particular embodiment, the lower compartment has a disc-shaped geometry having a diameter of from 100 µm to 2000 µm and a height of from 15 to 60 µm or from 18 to 40 µm.

In a particular embodiment, the upper compartment has a disc-shaped geometry having a diameter of 1000 µm or 1100 µm and a height of at least 100 µm, in particular from 100 to 200 µm.

In a particular embodiment, the lower compartment has a height of from 15 to 60 µm or from 18 to 40 µm, and the upper compartment has a height of from 100 µm to 200 µm.

In a particular embodiment, the lower compartment and the upper compartment have a disc-shaped geometry, and the lower compartment has a diameter of 1000 µm and the upper compartment has a diameter of 1100 µm. The difference between the considered diameters may simplify the fabrication process, in particular may favor proper alignment of the structures during the fabrication. In such an embodiment, the lower compartment advantageously has a height of from 15 to 60 µm or from 18 to 40 µm, and the upper compartment advantageously has a height of from 100 µm to 200 µm.

The device according to the invention comprises a membrane positioned within the chamber in a manner that separates the chamber into the upper compartment and the lower compartment.

According to one embodiment of the invention, the membrane is made of a flexible or deformable material. Said flexible or deformable material may be flexed or deformed in accordance with a force exerted thereupon, for example by a pressure applied to a liquid fluid in the upper compartment of the device according to embodiments disclosed herein.

When the device is used according to the invention, the membrane is thus capable of being elastically deformed or flexed in response to a stimulation applied thereto, such as a pressure applied to the fluid reservoir connected to the upper fluidic network in such a way that the liquid fluid, in particular water, circulating the upper fluidic network causes a pressure differential between the upper compartment and the lower compartment.

The pressure applied to the fluid reservoir connected to the upper fluidic network causes the liquid fluid circulating the upper fluidic network and through the upper compartment to exert force normal to the surface of the membrane. As a result, the center part of the membrane is flexed or lowered toward the bottom surface of the lower compartment. The device according to the invention is configured so that the membrane does not adhere to or touch the top surface of the upper compartment. Specifically, the dimensions of the upper compartment and the lower compartment are configured to prevent the membrane to bend or flex in a manner as to contact the top surface or ceiling of the upper compartment. The deformation of the membrane is reversible and may be ceased with adjusting the pressure applied to the fluid reservoir. When the membrane, in particular made of polydimethylsiloxane (PDMS), is flexed or lowered toward the bottom surface of the lower compartment of the chamber (i.e., third element as will be described hereafter), in particular made of glass, in the presence of injected cells in said compartment, the distance between the membrane and the bottom surface (i.e., third element as will be described hereafter) is such that it enables and constrains said cells to grow or to align as a two-dimensional culture, e.g., as a monolayer culture.

The introduction of a fluid, in particular a liquid fluid, such as water, in the upper compartment through the upper fluidic network does not cause the ceiling of the upper compartment to deform, even when the pressure is applied to the fluid reservoir connected to the upper fluidic network so as to actuate the membrane so that the center part of the membrane flexes or lowers toward the bottom surface of the lower compartment.

As disclosed herein, the term "center part" of the membrane denotes an area in the middle of the membrane. When the center part of the membrane flexes or lowers toward the bottom surface of the lower compartment, the area in the middle of the membrane that is in proximity to the bottom surface of the lower compartment has a diameter of from 68 to 800 µm, or from 68 to 400 µm, or from 136 to 400 µm.

In a particular embodiment, the thickness of the ceiling of the upper compartment (as will be described hereinafter, the thickness between the top surface of the upper compartment and the second face of the top element, in particular the second element) is greater than the thickness of the membrane.

In a particular embodiment, the ratio of the thickness of the membrane to the height of the lower compartment is in the range of 0.5 to 1.5.

In a particular embodiment, the ratio of the diameter of the upper compartment to the diameter of the lower compartment is in the range of 0.8 to 1.2.

In a particular embodiment, the ratio of the thickness of the membrane to the height of the lower compartment is in the range of 0.5 to 1.5 and the ratio of the diameter of the upper compartment to the diameter of the lower compartment is in the range of 0.8 to 1.2.

Advantageously, the ratio of the diameter of the lower compartment to the width of the lower inlet channel is from 2 to 5, in particular 3.5, the ratio of the diameter of the lower compartment to the width of the lower outlet channel is from 2 to 5, in particular 3.5, the ratio of the diameter of the lower compartment to the height of the lower compartment is from 15 to 100, in particular from 15 to 30, the ratio of the thickness of the membrane to the height of the lower compartment is from 0.5 to 1.5, and the ratio of the diameter of the upper compartment to the diameter of the lower compartment is from 0.8 to 1.2.

In a particular embodiment, the ratio of the diameter of the lower compartment to the width of the lower inlet channel is 3.5, the ratio of the diameter of the lower compartment to the width of the lower outlet channel is 3.5, the ratio of the diameter of the lower compartment to the height of the lower compartment is from 15 to 30, the ratio of the thickness of the membrane to the height of the lower compartment is from 0.5 to 1.5, and the ratio of the diameter of the upper compartment to the diameter of the lower compartment is from 0.8 to 1.2

The inventors have discovered that the combination of the above-mentioned ratios is advantageous to allow the formation of a liquid nanolayer of a cell growth medium, between the membrane and the bottom of the lower compartment, providing an optimal two-dimensional cell growth area, at a pressure applied to the liquid medium in the upper compartment of the device according to the embodiments disclosed herein.

In a particular embodiment, the membrane is impermeable and non-porous so that fluids, in particular liquid fluids, in the upper compartment and the lower compartment, and cells in the lower compartment cannot pass through the membrane and migrate to the adjacent compartment.

In some embodiments, the membrane comprises regular or irregular nanostructures or nanocracks. Such nanostructures or nanocracks may be created by a buckling procedure.

Said regular or irregular nanostructures or nanocracks may enable the microfluidic device of the invention to operate at a higher pressure. For example, said nanostructures or nanocracks allow a higher pressure to be applied to the upper compartment so as to actuate, in particular lower, the membrane toward the bottom surface of the lower compartment without impeding the cell culture medium circulation in the lower compartment or damaging the two-dimensional monolayer cell culture. A higher pressure applied to the upper compartment increases the stability of the membrane and the 2D growth of cells or bacteria.

In a particular embodiment, the membrane is transparent. In a particular embodiment, the membrane has a thickness of from 5 to 100 µm, in particular from 10 to 40 µm. Preferably, the thickness of the membrane is smaller than the height of the lower compartment.

The geometry of the lower compartment and the membrane thickness has the following mathematical relationship. The maximum height of the lower compartment, $H_{cmax}$, can be expressed as $H_{cmax}=[(a \cdot R_c^2)+(b \cdot R_c)+c]$, where a, b, and c are functions of the membrane thickness (h) and thus only dependent on the membrane thickness. The thickness of the membrane varies according to the radius or diameter of the lower compartment. The functions a, b, and c allow for determining the maximum height of the lower compartment ($H_{cmax}$) in association with the radius of the lower compartment ($R_c$). Consequently, the equations linking $H_{cmax}$ and $R_c$ change in function of the thickness of the membrane (h). The determination of the maximum height of the lower compartment at various radius of the lower compartment for a given membrane thickness is demonstrated in Example 15 and FIG. 12.

In a particular embodiment, the membrane has an elastic modulus of 1 to 2.5 MPa. The elastic modulus can be measured by (nano)indentation techniques (Khanafer et al. 2009; Johnston et al. 2014 and De Paoli 2015). For illustration purposes, for a PDMS membrane prepared with silicon elastomer base (pre-polymer) and curing agent that are mixed at a mixing ratio of 1:20 (curing agent: pre-polymer), fabricated according to the steps described in Example 8, for example, by pouring the mixture into a mold (silicon wafer) and spinning the mixture on a spin coater to obtain a thickness of 40 µm, followed by an incubation at room temperature for 20 min and curing at 80 degrees for 18 minutes, the Young's modulus of the membrane could be estimated as close to 2 MPa.

Advantageously, the ratio of the diameter of the lower compartment (12) to the width of the lower inlet channel is from 2 to 5, in particular 3.5, the ratio of the diameter of the lower compartment (12) to the width of the lower outlet channel is from 2 to 5, in particular 3.5, the ratio of the diameter of the lower compartment (12) to the height of the lower compartment (12) is in the range between 15 and 100, in particular between 15 and 30, the ratio of the thickness of the membrane to the height of the lower compartment is in the range between 0.5 and 1.5, the ratio of the diameter of the upper compartment to the diameter of the lower compartment is in the range between 0.8 and 1.2, and the membrane has an elastic modulus of 1 to 2.5 MPa.

According to a particular embodiment of the invention, when the device is fabricated, the membrane is comprised in the first element, as will be described hereafter. In one embodiment of the invention, the membrane is made of a hydrophobic material. In a particular embodiment, the membrane is made of polydimethylsiloxane (PDMS), poly(ethylene glycol) diacrylate (PEGDA), polybutylene adipate terephthalate (PBAT) or Ecoflex®, fluorinated polymers, or transparent polyurethane elastomers.

The membrane constitutes the top surface of the lower compartment. The bottom surface of the lower compartment is constituted by the third element when the device is fabricated. In one embodiment, the bottom surface of the lower compartment is made of a hydrophilic material, preferably glass, more preferably transparent glass. The bottom surface of the lower compartment may be made of transparent silicone, poly(methyl methacrylate) (PMMA), gorilla glass, or sapphire glass.

The top surface of the lower compartment may contain regular or irregular nanostructures or nanocracks.

Besides constraining the cells and enabling their two-dimensional culture and observation thereof, the lower compartment is used for circulating a cell culture medium and optionally molecules to be tested on the cells and/or molecules to be used as markers of cell compartments or cell features. The device according to the invention is configured and used so that a pressure applied to the fluid reservoir containing the liquid medium in the upper compartment actuates the membrane to deform in a manner that lowers the center part of the membrane toward the bottom surface of the lower compartment. In a particular embodiment of the invention, said applied pressure in a range of from 10 mbar to 300 mbar, preferably from 20 mbar to 170 mbar, does not impede the cell culture medium circulation and enables cells to be maintained as a two-dimensional or monolayer culture. In particular embodiments of the invention, the pressure applied to the molecule reservoir connected to the lower fluidic channel is smaller than or equal to 100 mbar.

The pressure differential between the upper compartment and the lower compartment does not exceed 70 mbar.

In one embodiment of the invention, the regular or irregular nanostructures or nanocracks formed on the membrane (i.e., on the top surface of the lower compartment) may allow for efficient medium circulation in the lower compartment at an applied pressure higher than 70 mbar or 100 mbar, for example up to 1000 mbar.

In some embodiments of the invention, the body comprises at least two chambers, in particular up to 160 chambers, preferably twenty chambers. Each chamber is separated into an upper compartment and a lower compartment by a membrane disposed between the upper compartment and the lower compartment, said upper compartment being comprised in the upper fluidic network and said lower compartment being comprised in the lower fluidic network.

The lower inlet channels may be connected to a common lower inlet port allowing a fluid to enter into the at least two lower compartments, preferably twenty lower compartments, and/or the lower inlet channels may be connected to at least two independent inlet ports allowing different or mixed fluids to enter into each of said at least two, preferably twenty, lower compartments. In a particular embodiment, the lower inlet port is comprised in the first element and connected to the lower fluidic network. In a particular embodiment, the lower inlet port is comprised in the first element and the second element and connected to the lower fluidic network. In such an embodiment, the lower inlet port is connected to the lower fluidic network from the second element, in particular from the first face of the second element, to the lower fluidic network via a channel or channels passing through the second element and the first element vertically so as to reach the lower fluidic network.

In particular embodiments, the lower fluidic network comprises a concentration gradient generator, for example a conventional tree-like gradient generator, having a plurality of inlets and a plurality of outlets. The inlets of the concentration gradient generator are connected to at least two lower inlet ports and the outlets of the concentration gradient generator are connected to the lower inlet channels of said at least two, preferably twenty, lower compartments, thereby allowing (i) at least two different fluids to enter into the concentration gradient generator and be mixed at different concentrations and (ii) the resulting fluids with different concentrations to enter into the lower compartments.

The lower outlet channels may be connected to a common lower outlet port allowing the fluid from the lower compartments to exit through a single outlet port to a single liquid fluid receptacle, for example. The lower outlet channels may be connected to independent outlet ports allowing the different fluids from the lower compartments to exit through independent outlet ports to independent liquid receptacles, for example.

The channels comprised in the upper fluidic network may connect said at least two upper compartments, preferably twenty upper compartments, in parallel or in series. The upper inlet channels may be connected to a common upper inlet port and the upper outlet channels may be connected to a common upper outlet port allowing the fluid circulating through or fed into the upper fluidic network and the upper compartments to actuate the membranes, i.e., the membranes of said at least two, preferably twenty, chambers.

In particular embodiments, the upper fluidic network is connected to at least one upper inlet port and at least one upper outlet port, the at least one inlet port being connected to at least one liquid reservoir, in particular at least one water reservoir.

The lower compartment is used for two-dimensional cell culture, in particular two dimensional cell growth and/or cell differentiation and/or observation of cell challenge and reaction. A cell culture medium travels through the lower compartment through the lower fluidic network. The cell culture medium enters the lower compartment through the lower inlet channel and exits the lower compartment through the lower outlet channel.

In one embodiment, the upper compartment is used for circulating a liquid fluid, preferably water. The liquid fluid enters the upper compartment through the upper inlet channel and exits the upper compartment through the upper outlet channel.

The lower fluidic network may comprise a concentration gradient generator, for example a conventional tree-like gradient generator, having at least five outlets, each of the outlets being connected to at least one lower compartment. The number of outlets of the concentration gradient generator corresponds to the number of different concentrations of a solute, for example a drug.

In one embodiment, the lower fluidic network comprises a concentration gradient generator having 6, 7, 8, 9 or 10 outlets.

In one embodiment, the number of chambers comprised in the body is at least the same as the number of outlets of the concentration gradient generator comprised in the lower fluidic network. In one embodiment, the number of chambers comprised in the body is at least two times the number of outlets of the concentration gradient generator comprised in the lower fluidic network. In one embodiment, the number of chambers comprised in the body is at least four times the number of outlets of the concentration gradient generator comprised in the lower fluidic network.

In one embodiment, the body comprises at least 5 chambers. In one embodiment, the body comprises at least 10 or 20 chambers.

The body may comprise a number of chambers in a range of from 1 to 300, or from 1 to 200, or from 1 to 100.

In a particular embodiment, the body comprises 20 chambers. In a particular embodiment, the upper fluidic network is connected to one upper inlet port and one upper outlet port, the upper inlet port being connected to a liquid fluid reservoir, in particular a water reservoir, through the upper fluidic network for actuating the membrane. In a particular embodiment, the lower fluidic network is connected to two lower inlet ports and one lower outlet port and comprises a circuit of concentration gradient generator having at least five outlets between the two lower inlet ports and the lower outlet port. One lower inlet port is connected to a molecule reservoir and a culture medium reservoir via an M-switch valve and the other lower inlet port is connected to a second culture medium reservoir.

In a particular embodiment, the circuit of concentration gradient generator has five outlets, each of the outlets being connected to at least one lower compartment, in particular two or four lower compartments. Such a device design is herein referred to as a 5-condition platform. The 5-condition platform makes it possible to test up to five different concentrations of a solute comprising assayed molecule(s) (e.g., a drug or molecules to be used as markers of cell compartments or cell features). An exemplary embodiment of the 5-condition platform is shown in FIG. 2.

In one embodiment, the lower fluidic network may comprise n number of lower inlet ports, n being equal to 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50 or 51. In one embodiment, at least one of said n number of lower inlet ports is connected to a fluid reservoir containing cells in suspension and/or a fluid reservoir containing a cell culture medium for introducing cells in suspension and a cell culture medium into the lower compartment.

In a particular embodiment, each chamber is connected to one lower inlet port connected to a fluid reservoir containing a molecule suspension or solution, in particular a drug suspension or solution or a suspension or solution containing molecules to be used as markers of cell compartments or cell features.

In one embodiment, the number of chambers comprised in the body is the same as the number of lower inlet ports minus one. In one embodiment, the number of chambers comprised in the body is two times the number of lower inlet ports minus one. In one embodiment, the number of chambers comprised in the body is three times the number of lower inlet ports minus one. In one embodiment, the number of chambers comprised in the body is four times the number of lower inlet ports minus one.

In one embodiment, the body comprises at least 32 chambers. In a particular embodiment, the body comprises a number of chambers corresponding to any multiple of 32, for example 32, 64, 96, or 128.

In a particular embodiment, the body comprises 64 chambers, in particular arranged into 4 rows of 16 chambers. In a particular embodiment, the body further comprises 32 lower inlet ports configured to be connected to 32 independent fluid reservoirs, in particular drug reservoirs, each of the 32 lower inlet ports being connected to two lower compartments via their respective lower inlet channels. Such a device design is herein referred to as a 32-condition platform.

In a particular embodiment, the 32-condition platform has a body comprising an upper fluidic network connected to one upper inlet port and one upper outlet port, and a lower fluidic network connected to 33 lower inlet ports and 1 lower outlet port. The upper inlet port is connected to a water reservoir for feeding water into the upper compartment(s) via the upper fluidic network and for actuating the membrane. The liquid fluid may or may not circulate through the upper fluidic network. In a particular embodiment, the outlet of the upper fluidic network is closed so that the liquid fluid remains static and a pressure is applied onto each membrane of the chamber(s) by applying pressure into a reservoir containing the liquid fluid that is connected to the inlet of the upper fluidic network via appropriate tubing, fitting(s), and connector(s).

One of the 33 lower inlet ports, which is herein referred to as medium inlets, is used to introduce cells in suspension into all of the 64 lower compartments and to circulate a culture medium through the 64 lower compartments for cell growth. The remaining 32 lower inlet ports, which are herein referred to as reservoir inlets, are connected to 32 independent molecule reservoirs, in particular drug reservoirs, for introducing each of the 32 solutions or suspensions comprising molecules, in particular drug molecules or molecules to be used as markers of cell compartments or cell features, to two lower compartments. Each of the 32 solutions or suspensions may comprise different molecules, in particular different drug molecules, and/or different cell types and/or mutants to be seeded between the bottom surface of the lower compartment(s) and the third element. Alternatively, the 32 solutions or suspensions may comprise the same molecule, in particular drug molecule or molecules to be used as markers of cell compartments or cell features, at different concentrations.

In a particular embodiment, the body comprises a fluid reservoir controller (as will be hereinafter referred to as fourth element) having a first face and a second face and containing a number of openings equal to the number of reservoir inlets, in particular 32 openings. In a particular embodiment, the body comprises two fluid reservoir controllers, a first fluid reservoir controller and a second fluid reservoir controller (as will be hereinafter referred to as a fourth element and a fifth element, respectively), each having a first face and a second face and each containing a number of openings equal to half the number of reservoir inlets, in particular 16 openings per each of the fluid reservoir controllers. Each opening is an independent molecule reservoir or is configured to receive or contain an independent molecule reservoir, for example an independent drug reservoir. Each opening of the molecule reservoir is connected to each lower inlet port of the lower fluidic network so that up to 16 or up to 32 different solutions or suspensions can be dispensed to the lower compartments through corresponding lower inlet ports.

The fluid reservoir controller(s) is(are) made of the same material as the remainder of the body and/or the membrane. In a particular embodiment, the fluid reservoir controller(s) is(are) made of PDMS. In a preferred embodiment, the fluid reservoir controller(s) is(are) made of metal. The second face of the first fluid reservoir controller and the second face of the second fluid reservoir controller are in contact with or bonded to the one face of the remainder of the body, in particular with the aid of a thin layer of PDMS.

In a particular embodiment, each opening of the molecule reservoir is injected with a solution or suspension containing molecules of interest by means of an injector made of a plastic or polymer material which may be screwed into the opening to be secured.

In a particular embodiment, the body comprises a first fluid reservoir controller and a second fluid reservoir controller, each having a first face and a second face and containing 16 openings that are configured to contain 16 independent molecule reservoirs, in particular drug reservoirs, and/or cell reservoirs. The 16 openings of each of the first and the second fluid reservoir controllers are configured to be aligned with the 16 lower inlet ports. The first and the second fluid reservoir controllers simultaneously driven by a pressure controller.

The lower fluidic network comprises at least one serpentine flow resistor between the medium inlet and each of the lower compartments and at least one serpentine flow resistor between each of the reservoir inlet and each of the lower compartments. The device configuration makes it possible to switch between the medium and the solution or suspension comprising molecules, in particular a drug solution or suspension, by means of an external flow-rate control system.

The lower fluidic network of the 32-condition platform is connected to one lower outlet port, which is herein referred to also as a common lower outlet.

An exemplary embodiment of the 32-condition platform is described in FIGS. 3 and 4.

The invention also relates to a method for fabricating a microfluidic device according to the invention comprising:
a. producing a first element, in particular made of a moldable material, having a first face and a second face, wherein the second face comprises at least one depression, in particular at least one disc-shaped depression, at least one membrane, and at least two grooves connected to said at least one depression, said at least one membrane constituting the bottom of said at least one depression;
b. producing a second element, in particular made of a moldable material, having a first face and a second face, wherein the second face comprises at least one depression, in particular at least one disc-shaped depression and at least two grooves connected to said at least one depression;
c. bonding the first face of the first element and the second face of the second element together by stacking the second element on top of the first element so as to form (i) at least one upper compartment having a bottom surface constituted by the membrane, in particular the first face of the membrane, and (ii) the upper fluidic network comprising at least one upper inlet channel and at least one upper outlet channel; and d. bonding a third element, in particular a hydrophilic material having a planar geometry, such as a glass cover slip, and the second face of the first element together so as to form (i) at least one lower compartment having a bottom surface constituted by the third element, in particular the first face of the third element, and a top surface constituted by the membrane, in particular the second face of the membrane, and (ii) the lower fluidic network comprising at least one lower inlet channel and at least one lower outlet channel.

The body of the microfluidic device comprises or is made up of three vertically stacked elements, which are herein referred to as first element, second element, and third element, each having a first face and a second face. Each of the first element and the second element is monolithic and comprises, on its second face, at least one groove and at least one depression, in particular at least one disc-shaped depression, with dimensions corresponding to the dimensions of the channel(s) and at least one compartment of the chamber, respectively. The depth of at least one groove and the depth of at least one depression correspond to the height of at least one channel and the height of at least one compartment of the chamber, respectively.

At least one of the first and the second elements, in particular the first element, also comprises at least one membrane which constitutes the bottom, in particular the round bottom, of said at least one depression, in particular at least one disc-shaped depression of the first element or the second element.

The first face of at least one of the first and the second elements encompasses the first face of the membrane. Particularly, the first face of the membrane is constituted by the first face of at least one of the first and the second elements, and therefore the first face of all membranes share one face that is continuous and that extends over the first face of at least one of the first and the second elements.

Preferably, the first or the second element is monolithic and comprises at least one membrane, in particular all membranes, between the bottom surface of at least one depression, in particular at least one disc-shaped depression, and the second face of said first or second element. Thus, the membrane is part of the monolith of the first or the second element.

The second element is disposed on top of the first element in a manner such that the second face of the first element and the second face of the second element, each containing said at least one groove and said at least one depression, are facing the same direction and downward. The vertically stacked first element and the second element form the upper fluidic network and at least one upper compartment connected thereto via at least one upper inlet channel and at least one upper outlet channel. The bottom of said at least one upper compartment is constituted by a membrane.

When stacked, the first and the second elements are positioned relatively to one another such that a face of at least one membrane is constituted by the first face of at least one of the first and the second elements, in particular of the first element when this element is the lower element in the device.

In a particular embodiment, the thickness between the bottom of the depression, in particular the disc-shaped depression, and the first face of the top element, in particular the second element, is greater than the thickness between the bottom of the depression, in particular the disc-shaped depression, and the first face of the bottom element, in particular the first element.

In a preferred embodiment, the depth of the depression of the top element, in particular the second element, is greater than or equal to the depth of the depression of the bottom element, in particular the first element. When the first, the second, and the third elements are stacked together, in particular so that the second element is disposed on the first face (i.e., the top) of the first element and the third element is disposed on the second face (i.e., the bottom) of the first element, the height of the thereby formed upper compartment is greater than or equal to the height of the thereby formed lower compartment.

Preferably, the first element and the second element are made of a same material that is biocompatible. In a particular embodiment, the first element and the second element are made of a hydrophobic material or at least have an external hydrophobic surface.

In a particular embodiment, said material that the first element and the second element are made of a flexible material having an elastic modulus of from about 0.1 to about 1000 MPa.

Preferably, the first element, which provides the membrane dividing the chamber into two compartments, is made of a hydrophobic material or at least has an external hydrophobic surface.

In a particular embodiment, each of the first element and the second element is made of a transparent or translucent material.

In a particular embodiment, the first and the second elements are made of a moldable material.

In a particular embodiment, the first element and the second element, independently of each other, are made of a material selected from the group consisting of polydimethylsiloxane (PDMS), polyethylene (glycol) diacrylate (PEGDA), perfluorinated compounds, fluorinated polymers, transparent rubber urethane, and Ecoflex, in particular PDMS.

In a preferred embodiment, the first element, and optionally also the second element, is(are) made of PMDS having an elastic modulus of from about 0.5 to about 3 MPa.

In some embodiments, the first element and the second element are made of different materials, especially of materials, wherein both of the materials have features selected among the above-described features.

In a particular embodiment, the first element is made of PDMS and the second element is made of glass.

The body further comprises a third element, the first face of which is in contact with the second face of the first element in such a way as to form the lower fluidic network and at least one lower compartment connected thereto via at least one lower inlet channel and at least one lower outlet channel.

In a particular embodiment, the third element is made of a hydrophilic material or at least has an external hydrophilic surface. Preferably, the third element is biocompatible and sealable with the first element and/or the second element.

In a particular embodiment, the third element is compatible with immersion oils. In another embodiment, the third element is compatible with 100× objective imaging.

In a particular embodiment, the third element is rigid and has Young's modulus greater than 50 GPa.

In a particular, the third element is selected from the group consisting of glass, transparent silicon, poly(methyl methacrylate), Gorilla glass, and Sapphire glass.

In a preferred embodiment, the third element is made of transparent glass. In a particular embodiment, the third element is a glass coverslip having a thickness of 175 µm.

In some embodiments, the membrane comprises regular or irregular nanostructures or nanocracks. Such nanostructures or nanocracks may be created by a buckling procedure. In an exemplary embodiment, the buckling procedure is carried out after bonding the first element and the second element of the body and before bonding the third element by injecting air into the upper compartment through the upper fluidic network so as to deform or flex the membrane, exposing the face of the membrane located opposite of the face of the membrane in contact with air to oxygen plasma or UV-ozone, reversibly bringing the membrane back to its original shape, and exposing the same face of the membrane that was exposed to oxygen plasma or UV-ozone again to oxygen plasma.

The first element, the second element, and the third element are bonded so as to ensure that their boundaries are free of delimitation and sealed watertight.

The lower fluidic network is formed by bonding the second face of the first element and the first face of the third element together and the upper fluidic network is formed by bonding the first face of the first element and the second face of the second element together.

The thus formed upper fluidic network and the lower fluidic network are used to circulate a liquid or gas fluid through at least one upper compartment and at least one lower compartment of the chamber, respectively.

In a preferred embodiment of the invention, the upper fluidic network is used to circulate a liquid fluid, in particular water, through the upper compartment for applying hydraulic pressure to the membrane and the lower fluidic network is used to introduce a suspension of cells in the lower compartment and circulate a culture medium and optionally liquid fluid comprising molecules, such as molecules assayed for determination of their activity on cell biology, including cell growth, differentiation or functions, and/or molecules to be used as markers of cell compartments or cell features, or different cell types, different strains of the same cell type and/or mutants in mono- or co-culture, through the lower compartment.

A continuous injection of a gas, in particular air, in the upper compartment may cause a potential risk of creating bubbles, which would render the system unstable. Accordingly, gas administration is preferably avoided, including for actuation of the membrane.

In a particular embodiment, the viscosity of the liquid fluid for generating hydraulic pressure in the upper compartment to actuate the membrane is in the range of from 0.65 to 0.79 mPa·s.

The liquid fluid may be selected from the group consisting of water, dimethyl sulfoxide, glycerol, oil such as fluorinated oil, and agarose.

The hydraulic control of the device (i.e., applying hydraulic pressure to the upper fluidic network or upper compartment so as to exert force on the membrane thereby deforming the membrane) offers the possibility of observing the interface between the top surface and the bottom surface of the lower compartment, in particular by analyzing the reflectance of said interface between which cells, for example, bacteria can be tested, cultured, or grown in two dimensions. The circulation of a cell culture medium and the shape of the membrane could also be observed without interference.

In a particular embodiment of the invention, the lower fluidic network contains at least one flow resistor, in particular at least one serpentine flow resistor. A flow resistor, in particular a serpentine flow resistor, is a channel that contains at least one curvature that turns the fluid passing through it by 180 degrees. At least one fluid resistor may be used in a device comprising multiple chambers. The flow resistor normalizes flow rates in the channels comprised in a fluidic network, especially when the channels comprised in the fluidic network have different lengths or different fluidic resistances.

In one embodiment, the lower fluidic network has the same height throughout the lower fluidic network. In one embodiment, the upper fluidic network has the same height throughout the upper fluidic network.

In one embodiment, the lower fluidic network and the upper fluidic network have identical channel height and width. Particular values for height and width are those disclosed and illustrated herein.

In one embodiment, the lower fluidic network and the upper fluidic network have identical channel width, and different channel height. In particular, the channel height of the upper fluidic network is greater than the channel height of the lower fluidic network.

The body further comprises at least one upper inlet port and at least one upper outlet port for the upper fluidic network and at least one lower inlet port and at least one lower outlet port for the lower fluidic network.

In an embodiment, said at least one upper inlet port, said at least one upper outlet port, said at least one lower inlet port, and said at least one lower outlet port of the device are all located on the first face of the second element.

Said at least one upper inlet port and said at least one lower inlet port are connected to at least one fluid reservoir, for example via tubing and appropriate fitting(s) and connector(s).

In an embodiment, said at least one upper inlet port is connected to a reservoir containing water and each of said at least one lower inlet port is connected to at least one culture medium reservoir and/or at least one tested molecule reservoir, in particular drug reservoir, and/or at least one reservoir containing molecules to be used as markers of cell compartments or cell features.

As used herein, the term "molecule(s)" denotes molecules of one or more types in a solution or suspension. Said molecules may be compounds whose activity is assessed on the cultured cells, in particular drug molecules or drug candidate molecules, or may be molecules to be used as markers of cell compartments or cell features, or cell suspension containing different cell types, strains or mutants.

In an embodiment, the fluid reservoir connected to the upper inlet port or the lower inlet port is inert to water and dimethyl sulfoxide. In a particular embodiment, said fluid reservoir is resistant to a pressure of up to 100 mbar. In a particular embodiment, said fluid reservoir is made of a material that is impermeable or weakly permeable, in particular aluminum, polyvinyl chloride, or glass.

Each of said at least one lower inlet port may be connected to a bubble trap, a switch valve, and/or a flowmeter before reaching said at least one culture medium reservoir and/or at least one molecule reservoir.

In one embodiment, the body comprises at least two lower inlet ports for the lower fluidic network and one of said at least two lower inlet ports is connected to a culture medium reservoir and each of the remaining lower inlet port(s) is connected to a molecule reservoir.

In an embodiment, said water reservoir is connected to a first outlet of a pressure controller and said at least one culture medium reservoir and said at least one molecule reservoir are connected to a second outlet of the pressure controller.

Each of said at least one upper outlet port and the lower outlet port is connected to at least one reservoir for collecting the liquid fluid exiting their respective fluidic network, for example via tubing and appropriate fitting(s) and connector(s).

In an embodiment, the upper fluidic network is connected to only one upper outlet port and the lower fluidic network is connected to only one lower outlet port.

In a particular embodiment, the first element and the second element are fabricated using respective molds. In a particular embodiment, the molds of the first element and the second element are silicon wafers manufactured by a photolithography process. The silicon wafer molds contain raised features corresponding to the dimensions and shape of at least one channel and at least one compartment.

In a particular embodiment, the first element and second element are fabricated by casting a curable pre-polymer base, such as polydimethylsiloxane (PDMS), poly(ethylene glycol) diacrylate (PEGDA), polybutylene adipate terephthalate (PBAT) or Ecoflex®, fluorinated polymers, or transparent polyurethane elastomers, into the respective molds.

When stacked, the first and the second elements are positioned relatively to one another such that the first face of the first element constitutes a first face of at least one membrane.

In a particular embodiment, the thickness between the bottom of the depression, in particular the disc-shaped depression, and the first face of the second element is greater than the thickness between the bottom of the depression, in particular the disc-shaped depression, and the first face of the first element.

In a preferred embodiment, the depth of the depression of the second element is greater than or equal to the depth of the depression of the first element. When the first, the second, and the third elements are stacked together, in particular so that the second element is disposed on the first face of the first element and the third element is disposed on the second face of the first element, the height of the thereby formed upper compartment is greater than or equal to the height of the thereby formed lower compartment.

The depth of the depression, in particular the disc-shaped depression, of the first element corresponds to the height of the lower compartment and the depth of the depression, in particular the disc-shaped depression, of the second element corresponds to the height of the upper compartment.

The depth of the groove of the first element corresponds to the height of the channel comprised in the lower fluidic network and the depth of the groove of the second element corresponds to the height of the channel comprised in the upper fluidic network.

The width of the groove of the first element corresponds to the width of the channel comprised in the lower fluidic network and the width of the groove of the second element corresponds to the width of the channel comprised in the upper fluidic network.

Preferably, the first element and the second element are made of a same material that is biocompatible. In a particular embodiment, the first element and the second element are made of a hydrophobic material or at least have an external hydrophobic surface.

In a particular embodiment, said material that the first element and the second element are made of a flexible material having an elastic modulus of from about 0.1 to about 10 MPa.

In some embodiments, the first element and the second element are made of different materials. Preferably, the first element, which comprises the membrane dividing the chamber into two compartments, is made of a hydrophobic material or at least has an external hydrophobic surface.

In a particular embodiment, each of the first element and the second element is made of a transparent or translucent material.

In a particular embodiment, the first and the second elements are made of a moldable material.

In a preferred particular embodiment, the first element and the second element are made of a material selected from the group consisting of polydimethylsiloxane (PDMS), polyethylene (glycol) diacrylate (PEGDA), polybutylene adipate terephthalate (PBAT), perfluorinated compounds, fluorinated polymers, transparent rubber urethane such as transparent polyurethane elastomers, and Ecoflex®, in particular PDMS.

In a preferred embodiment, the first element and the second element are made of PMDS having an elastic modulus of from about 0.5 to 3 MPa.

In a particular embodiment, the second element is separated from its mold and the second face of the second element is placed on top of the first face of the first element still sitting in its mold. In a particular embodiment, a curable pre-polymer base is poured into the assembled first and second elements to bond the first element (i.e., the first face of the first element) and the second element (i.e., the second face of the second element) together. In a particular embodiment, the curable pre-polymer base used to bond the first element and the second element together is the same as the curable pre-polymer base used to fabricate the first element and the second element. The assembly of the first element and the second element is then removed from the mold of the first element. The thus assembled first element of the second element form (i) at least one upper compartment having a bottom surface constituted by the membrane and (ii) the upper fluidic network comprising at least one upper inlet channel and at least one upper outlet channel.

In a particular embodiment, the third element is made of a hydrophilic material or at least have has an external hydrophilic surface. Preferably, the third element is biocompatible and sealable with the first element.

In a particular embodiment, the third element is compatible with immersion oils. In another embodiment, the third element is compatible with 100× objective imaging.

In a particular embodiment, the third element is rigid and has Young's modulus greater than 50 GPa.

In a particular embodiment, the third element is selected from the group consisting of glass, transparent silicon, poly(methyl methacrylate), Gorilla glass, and Sapphire glass.

In a preferred embodiment, the third element is made of glass, in particular transparent glass. In a particular embodiment, the third element is a glass coverslip having a thickness of 175 µm.

In a particular embodiment, the second face of the first element, in particular made of PDMS, and the first face of the third element, in particular made of glass, are treated by oxygen plasma and the two faces are put in contact with each other for bonding. The bonding of the second face of the first element and the first face of the third element provides (i) at least one lower compartment having a bottom surface constituted by the third element, in particular glass, and a top surface consisting of the membrane and (ii) the lower fluidic network comprising at least one lower inlet channel and at least one lower outlet channel.

In a particular embodiment, the body comprises a fourth element having a first face and a second face and containing a number of openings equal to the number of reservoir inlets, in particular 32 openings. In a particular embodiment, the body comprises a fourth element and a fifth element, each having a first face and a second face and each containing a number of openings equal to half the number of reservoir inlets, in particular 16 openings per each of the fourth and the fifth elements. Each opening is an independent molecule reservoir or is configured to receive or contain an independent molecule reservoir, for example an independent drug reservoir. Each opening of the molecule reservoir is connected to each lower inlet port of the lower fluidic network so that up to 16 or up to 32 different solutions or suspensions can be dispensed to the lower compartments through corresponding inlet ports.

The fourth element and the fifth element are made of the same material as the first element and/or the second element. In a particular embodiment, the fourth element and/or the fifth element is(are) made of PDMS. In a preferred embodiment, the fourth element and/or the fifth element is(are) made of metal. The second face of the fourth element and the second face of the fifth element are in contact with or bonded to the first face of the second element, in particular with the aid of a thin layer of PDMS.

In a particular embodiment, the body comprises a fourth element and a fifth element, each having a first face and a second face and containing a number of openings corresponding to the number or reservoir inlets, in particular 16 openings, that are configured to contain the same number, in particular 16, independent molecule reservoirs, in particular drug reservoirs. Each of the openings of each of the fourth element and the fifth element are configured to be aligned with each of the lower inlet ports. The fourth element and the fifth element are simultaneously driven by a pressure controller.

The invention also relates to a method for using the microfluidic device according to the invention for holding or culturing cells, in particular growing cells in two dimensions, e.g., as a monolayer or as two-dimensional colony forming units, comprising the steps of:
 a. introducing a cell suspension into the lower compartment to enable seeding of cells on the bottom surface of the lower compartment;
 b. introducing a liquid fluid, in particular water, into the upper compartment;
 c. applying a pressure of from 10 to 300 mbar, preferably from 20 to 170 mbar, to the upper compartment by maintaining the pressure differential of smaller than or equal to 70 mbar between the upper compartment and the lower compartment so as to lower the center part of the membrane toward the bottom surface of the lower compartment to trap the settled cells between the membrane and the bottom surface of the lower compartment, creating a two-dimensional cell growth area;
 d. optionally introducing a molecule solution or suspension, in particular a drug solution or suspension, or a solution or suspension containing molecules to be used as markers of cell compartments or cell features, into the lower compartment;
 e. allowing a cell culture medium to circulate through the lower compartment; and
 f. observing the cells, in particular observing a single cell, by a microscope through the bottom of the lower compartment.

In particular embodiment step of introducing molecules could be replaced by a step of introducing different cells suspensions.

The pressure experienced by the membrane in the upper compartment causes the center part of the membrane to lower toward the lower compartment creating a two-dimensional cell growth area, which is herein referred to also as a culture zone, where cells are trapped between the membrane and the bottom surface of the lower compartment. The lowering of membrane restricts the cell growth in a two-dimensional area, enabling the cells to be maintained in such two-dimensional area or to grow in a monolayer.

Such actuation of the membrane, in particular made of PDMS, by applying a pressure, advantageously in a range of from 20 mbar to 170 mbar to the fluid reservoir of the liquid fluid circulating the upper compartment does not only keep the cells in a firm position without damaging them but also promotes the formation of a nanolayer of liquid between the membrane and the bottom surface of the lower compartment (i.e., the third element) that is compatible with the circulation of the culture medium and is required for cell viability.

If the pressure in the upper compartment (and upper fluidic network) increases too much or if the liquid flow rate in the lower compartment decreases too fast, the membrane lowers abruptly and creates a micro-dome of about 2 µm high, thereby leading to the growth of cells or bacteria in three dimensions.

In a particular embodiment, the two-dimensional cell growth area has a radius of from about 34 and 400 µm, or from 34 to 200 µm, or from 68 to 200 µm. In a particular embodiment, the two-dimensional cell growth area has an area of from about 3600 µm$^2$ or 3630 µm$^2$ to about 126 000 µm$^2$ or 125 600 µm$^2$. Such two-dimensional cell growth area creates an observation area, which is sufficiently large for monitoring cell growth. As an example, the lower limit of the cell growth area (about 3600 µm$^2$) allows monitoring of at least one colony of *Mycobacterium smegmatis* for 24 hours (which requires approximately 2500 µm$^2$) and the upper limit of the cell growth area (about 126 000 µm$^2$) allows monitoring of about 50 colonies of the same. The upper limit of the two-dimensional cell growth area of about 126 000 µm$^2$ is sufficient for robust statistical analysis. A larger culture zone (i.e., two-dimensional cell growth area) would make it difficult to control the homogeneity of 2D cell growth.

The membrane stays deformed and flexed toward the bottom surface of the lower compartment (i.e., the third element). The membrane is lowered so that the height between the center part of the membrane and the bottom surface of the lower compartment can trap a monolayer of cells and does not allow cells to form a three-dimensional structure. The space between the membrane and the bottom surface of the lower compartment is dependent on the geometry of the lower compartment and the upper compartment, the membrane thickness, and the pressure applied to the upper compartment.

The combination of the upper and lower compartment geometry, the membrane geometry and pressure applied to the fluid reservoir (and experienced by the membrane) are required for the formation of two-dimensional cell growth area and two-dimensional cell growth, while allowing a layer of liquid, in particular a cell culture medium, to form between the membrane, in particular PDMS, and the bottom of the lower compartment (i.e., third element), in particular glass. The thickness of the thus formed layer of liquid is in the range of from 1 to 100 nm. The majority of the liquid fluid entering through the lower compartment via lower inlet channel flows around the two-dimensional cell growth area and exits the lower compartment via lower outlet channel.

The height of the upper compartment prevents or restricts the adhesion surface of the membrane on the ceiling (i.e., top surface) of the upper compartment.

The actuation of the membrane makes it possible to immobilize individual cells, in particular bacterial cells, in particular those having a width or diameter ranging from 0.2 to 30 µm, as monolayers or as colonies, in an efficient and durable manner.

Bacterial cells that can be cultured in the two-dimensional cell growth area between the membrane and the bottom surface of the lower compartment may be any aerobic bacterial cells, including but not limited to, *Mycobacterium smegmatis, Mycobacterium tuberculosis, Listeria monocytogenes, Neisseria meningitides, Streptococcus pneumonia, Pseudomonas aeruginosa,* and *Burkholderia cepacia.* Anaerobic species may also be cultured by modifying their survival/growth conditions to exclude oxygen.

Alternatively, the microfluidic device may be used for the culture and/or the observation of eukaryotic cells, in particular cells recovered from or comprised in a biological sample previously obtained from a subject or a patient, such as cells of a fluid sample, including blood or plasma, or cells of a solid tissue sample, such as a biopsy.

In a particular embodiment, the steps a, d, and e are carried out in a different order, in particular wherein the step of allowing a cell culture medium to circulate through the lower compartment is performed prior to introducing a molecule suspension or solution into the lower compartment. In a particular embodiment, the step d can be carried out after the step f, followed by an additional step g of washing out the solution or suspension, in particular a drug solution or suspension, introduced in the step d. In particular embodiments, the step f can be repeated multiple times as the observation of cells continues during and after each experimental step.

The device according to the invention makes it possible to carry out long-term (at least up to two weeks) microscopy imaging of the growth of individual cells in a monolayer in the two-dimensional cell growth area through the bottom of the lower compartment (i.e., through the third element).

In the particular embodiments of the invention, the flow rate of the medium or molecular solution or suspension in the lower compartment is in the range of from 10 to 40 µl/min.

The invention also relates to a method of assaying a compound, in particular a drug candidate on a cell or a cell culture, which comprises the steps of providing a culture of cell(s), wherein said culture has been carried out in a microfluidic device according to the invention, and contacting the cell(s) of the culture with the tested compound.

The invention further relates to a method of assessing cell phenotype, in particular of assessing changes in a cell phenotype, or assessing cell normal or abnormal or modified structure, function or status, in particular assessing cell infection, cell pathology or cell damages, which comprises the steps of providing cells as a cell culture contained in a microfluidic device according to the invention, and assessing cell phenotype, cell structure, cell function or cell status.

The invention further relates to a method of assessing the effect of a specific compound on cell phenotype, in particular assessing changes in a cell phenotype with respect to a control cell phenotype, which comprises the steps of contacting the cells with said specific compound when cultured in a microfluidic device according to the invention, and assessing their phenotype.

In a particular embodiment, cells are assessed as single cells.

In a particular embodiment, cells are assessed over a time period of at least 12 hours, in particular over at least 2 days and preferably up to 7 or 15 or 30 days. The monitoring period depends on the generation time of the analyzed species and can be up to at least 2 weeks in the case of a slow-growing bacterial species, such as *Mycobacterium tuberculosis* that divides once a day.

Particular features of the invention will be illustrated in the following figures and examples. The figures disclosed therein also define embodiments of the invention.

BRIEF DESCRIPTION OF THE DRAWINGS

FIG. 3: Schematic of the 32-condition device set-up (top view).

FIG. 4: Operating schematic of the lower fluidic network of the 32-condition device (bottom view).

FIG. 5: Picture of the 5-condition device and generation of liquid gradient.

FIG. 13: Formation of the liquid nanolayer that is essential for cell viability.

Figure 1A:
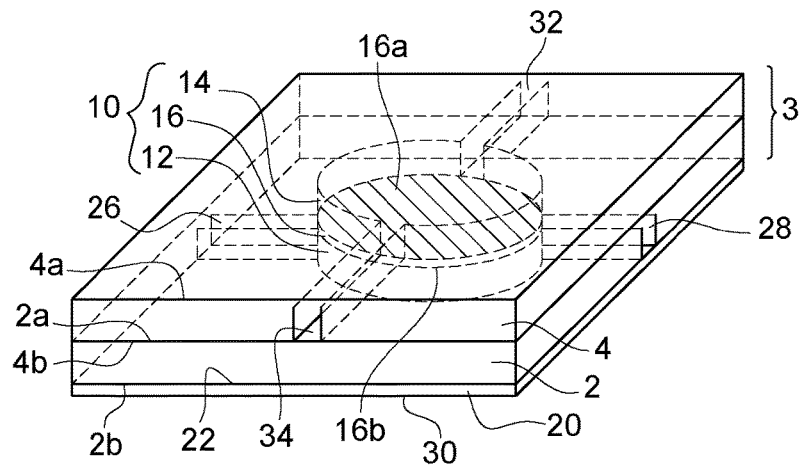
FIG. 1: Schematic of the operating principle of a single functional unit (culture chamber) of the invention.

The three-dimensional representation of a cell culture chamber 10 comprised in the body (3a, 3b) of the microfluidic device (1a, 1b) is shown in FIG. 1A. The chamber 10 comprises a lower compartment 12, an upper compartment 14, and a deformable membrane 16 disposed between the lower compartment 12 and the upper compartment 14, wherein the membrane 16 constitutes a top surface of the lower compartment 12 and a bottom surface of the upper compartment 14. The lower compartment 12, the lower inlet channel 26, and the lower outlet channel 28 are formed by vertically stacking a third element 20 and the first element 2 in a manner such that the first face 22 (or bottom surface 22 of the lower compartment 12) of the third element 20 is in contact with or assembled with the second surface 2b of the first element 2. The upper compartment 14, the upper inlet channel 32, and the upper outlet channel 34 are formed by vertically stacking a second element 4 and the first element 2 in a manner such that the second face 4b of the second element 4 is in contact with or assembled with the first face 2a of the first element 2.

Figure 1B:
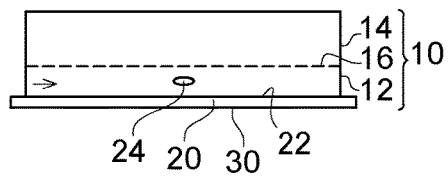
Figure 1C:
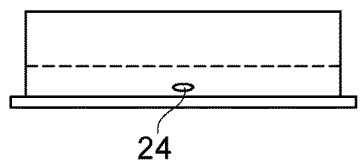
Figure 1D:
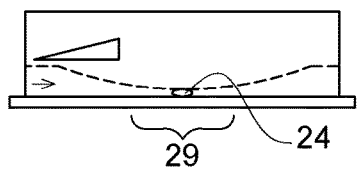
Figure 1E:
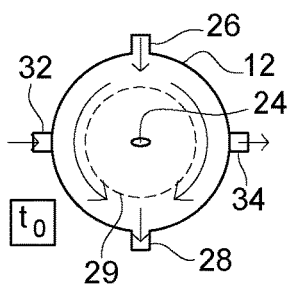
Figure 1F:
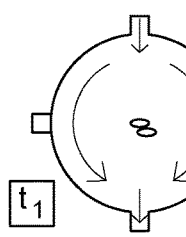
Figure 1G:
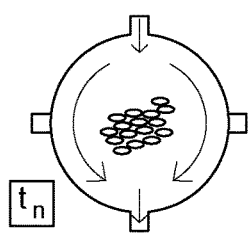
Figure 1H:
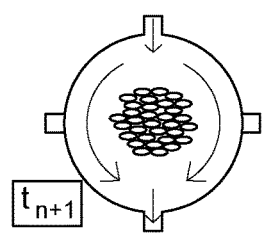

FIGS. 1B, 1C, and 1D show Infusion, Incubation, and Trapping of a cell, respectively; the lower compartment 12 injected with molecules of interest, and/or with cells 24, and a liquid medium, such as a cell growth or culture medium, and/or drug suspension or solution. The lower compartment 12 and the upper compartment 14 have a geometry that enables homogeneous actuation of the membrane 16, preferably a disc-shaped geometry, when pressure is applied onto the membrane 16 by a liquid fluid in the upper compartment 14, in particular water, which lowers the membrane toward the bottom surface 22 of the lower compartment 12, which is constituted by a third element 20, preferably made of a glass.

As an example, cell seeding occurs in 3 steps: 1) infusion of a single-cell suspension 24 in the lower compartment 12 as shown in FIG. 1A; 2) incubation of the microfluidic device at 37° C. for 20 min inside an incubator as shown in FIG. 1B (incubator not shown); and 3) cell trapping within a 2D cell growth and imaging area 29, which is formed by actuation of the PDMS membrane 16 with water injected in the upper compartment 14 (shown with a right triangle) so that a pressure difference between the upper and lower compartment is between 20 and 170 mbar. The lower compartment may be at atmospheric pressure or 1100 mbar, i.e., atmospheric pressure+100 mbar, and the upper compartment may be at a pressure higher than the lower compartment, for example, about 15 to 70 mbar higher. Cells 24 grow thanks to continuous perfusion of the growth medium (shown with an arrow) in the lower compartment injected, i.e., with a pressure applied to the reservoir containing the growth medium, in a range of from 20 to 300 mbar, in particular from 12 to 200 mbar.

FIGS. 1E, 1F, and 1G, and 1H show bottom view of the lower compartment 12. The diameter of the upper compartment (which is smaller than or equal to the diameter of the lower compartment 12 as it is hidden under the lower compartment 12 in these exemplary figures) is greater than the width of the upper inlet channel 32 and the width of the upper outlet channel 34. The diameter of the lower compartment 12 is greater than the width of the lower inlet channel 26 and the width of the lower outlet channel 28. The majority of the liquid fluid entering through the lower compartment 12 via lower inlet channel 26 flows around the two-dimensional cell growth and imaging area 29 and exits the lower compartment 12 via lower outlet channel 28.

Live-cell imaging is carried out from the bottom side 30 (or the bottom surface 30 or the second surface 30 of the third element 20) of the 2D imaging area 29 using an inverted microscope. The system is highly stable and allows not only monitoring single-cell growth for long-term imaging, but also to rapidly switch the environmental condition in the lower compartment 12. Different cell types can be monitored in this platform, which is intended for a variety of biological applications, such as the study of phenotypic variation, single-cell screenings, live immunostaining assays, high-resolution imaging, and infection assays, for example.

Figure 2C:
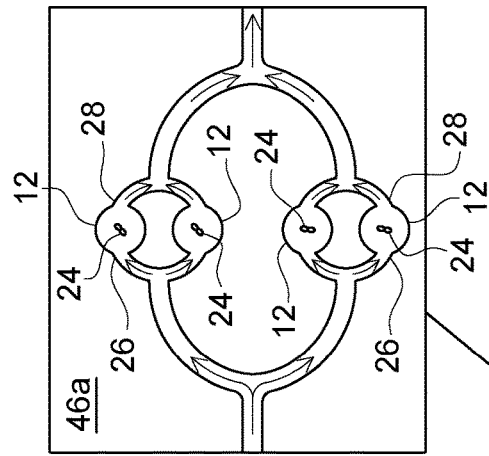
FIG. 2: Schematic of the 5-condition device set-up.
Figure 2B:
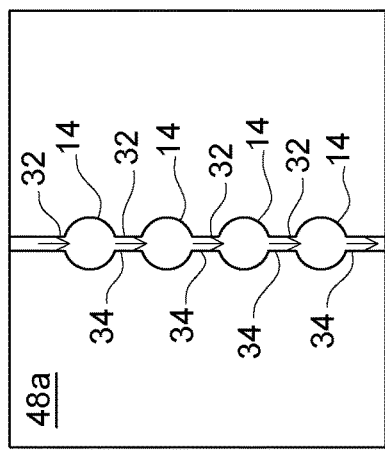
Figure 2A:
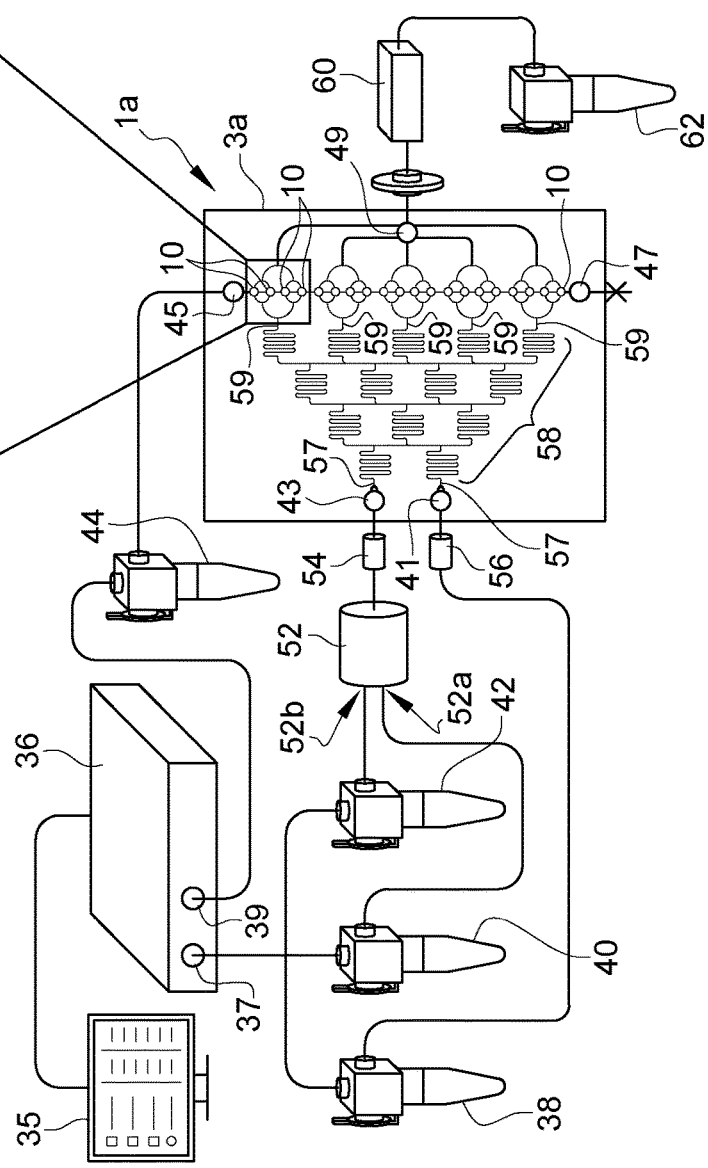

FIG. 2A shows an exemplary embodiment of a 5-condition device 1a comprising a body 3a. A pressure controller 36, via two independent outlet channels 37, 39, drives the actuation of four reservoirs 38, 40, 42, 44—the medium reservoirs 38, 40, the drug reservoir 42 and the water reservoir 44. The reservoirs, 38, 40, 42 are connected to the lower inlet ports 41, 43 of the lower fluidic network (all connected lower channels and lower compartments from the lower inlet ports 41, 43 to the lower outlet port 49, a part of the lower fluidic network 46a is shown in FIG. 2C), to reach the cells 24 seeded in the lower compartments 12 of the chambers 10 having 1 mm diameter (circles underneath the upper compartment of between the upper inlet port 45 and the upper outlet port 47, a part of the upper fluidic network 48a is shown in FIG. 2B). The reservoir 44 releases water to the upper fluidic network (all connected upper channels and upper compartments from the upper inlet port 45 and the upper outlet port 47), to fine-tune the actuation of the PDMS membrane of the microfluidic chambers 10. The injection is controlled by the pressure controller 36, which is in turn driven by a computer equipped with a flow-rate control module algorithm (Fluigent) 35. Additional valves are present to optimize the functioning of the device. In particular, the M-Switch valve (Fluigent) 52 rapidly switches the infusion from one condition to another; two bubble traps 54, 56 are integrated upstream the lower inlets ports 41, 43 to prevent entry of detrimental air inside the microchannels, and a flowmeter 60 is integrated downstream the lower outlet port 49 to constantly tweak the pressure and to preserve the flow stability. This exemplary 5-condition device comprises a body 3a comprising 20 chambers 10. The lower fluidic network 46 is connected to two lower inlet ports 41, 43 and one lower outlet port 49 and comprises a circuit of concentration gradient generator 58 having two inlets 57 and five outlets 59 between the two lower inlet ports 41, 43 and the lower outlet port 49. Each outlet 59 of the concentration gradient generator 58 is connected to at least four lower compartments 12. The lower outlet port 49 of the lower fluidic network 46 is connected to a sealed trash 62 via a 0.2 μm filter, to protect the environment from contamination.

An exemplary embodiment of a 32-condition device 1b comprising a body 3b is shown in FIG. 3A and a side view of such a device is shown in FIG. 3B. A part of the upper fluidic network 48b of such a device comprising a plurality of upper compartments 14 is shown in FIG. 3C and a part of the lower fluidic network 46b comprising a plurality of lower compartments 12 is shown in FIG. 3D. A pressure controller 64, via three independent outlet channels 65, 67, and 69 drives the injection of (i) a liquid medium in the medium reservoir 66 into a lower inlet port (i.e., a medium inlet) 71 and into the lower fluidic network, (ii) water in the water reservoir 68 into the upper fluidic network 48b via an upper inlet port 73, which fine-tunes the actuation of the PDMS membrane, and (iii) the drugs into a lower inlet port (i.e., a molecule/drug inlet) 88 and into the lower fluidic network 46b, through first fluid reservoir controller (i.e., the fourth element) 78 and second fluid reservoir controller (i.e., the fifth element) 80. The first fluid reservoir controller 78 and the second fluid reservoir controller 80 are in turn connected to the second element (the body 3b shown in this figure corresponds to the second element), and contain 2×16 independent drug reservoirs 84. Each drug reservoir 84 is connected to each inlet port of the lower fluidic network so that up to 32 different drug solutions or suspensions can be dispensed to the lower compartments of the 64 chambers 10 through corresponding inlet ports (underneath the drug reservoirs, not shown). The first fluid reservoir controller 78 and the second fluid reservoir controller 80 actuate the injection of drugs by means of air pressure 69. The whole injection system is controlled upstream by the pressure controller 64, which is in turn driven by a computer equipped with a flow-rate control module algorithm (Fluigent) 63. Additional valves are present to optimize and stabilize the functioning of the device. In particular, the lower inlet port 71 (i.e., medium inlet) is connected to the medium reservoir 66 via a flowmeter 72 and a bubble trap 76. The common lower outlet port 86 is connected to a sealed trash 70 via a flowmeter 74, and a 0.2 μm filter protects the environment from contamination.

As shown in FIG. 4, the lower fluidic network (all connected lower channels and lower compartments from each of the lower inlet port 88 and the lower outlet port 86) of a 32-condition device 1b is comprised of five sections— (i) 2×32 independent lower compartments 12 each having a diameter of 1 mm, where cells grow as monolayer, (ii) The medium inlet or the lower inlet port 71, through which the cells are fed into the lower compartments 12 via a tree-shaped network, (iii) The reservoir inlets 84 of 8 mm-diameter and lower inlet ports of 1.2 mm-diameter 88, where different solutions are stored within 32 independent reservoirs 84 and released by a pressure-controlled system (Fluigent) (not shown), (iv) For drug screening, the switch areas of the lower fluidic network 46b (shown in FIG. 4B), where the switching from medium to drug (for example, drug x from a drug reservoir 84x and drug y from a drug reservoir 84y) and vice-versa occurs, by means of an externalized flow-rate control system (Fluigent) and built-in flow resistors (serpentines) 94, (v) The waste collection, all lower compartments drain into a common lower outlet port 86.

FIG. 5 shows a 5-condition device 1a in which a dark dye and a light dye are injected at 75 $\mu l \cdot h^{-1}$ in the lower fluid network; a dark dye is injected into one lower inlet port 41 and a light dye is injected into another lower inlet port 43. A modified microfluidic gradient generator 58 (Wolfram et al., 2016) is used to mix the two solutions in a gradient of concentrations. Dilution factors were determined by fluorescein injection on the lower inlet port 41 and growth medium in the lower inlet port 43, and by measuring the fluorescence intensity in each complex 10a, 10b, 10c, 10d, and 10e of chambers 10 (four chambers per concentration, 10a to 10e). Dilution factors of complexes 10a, 10b, 10c, 10d, and 10e are 1×, 0.7×, 0.4×, 0.2×, and 0×, respectively.

Figure 7:
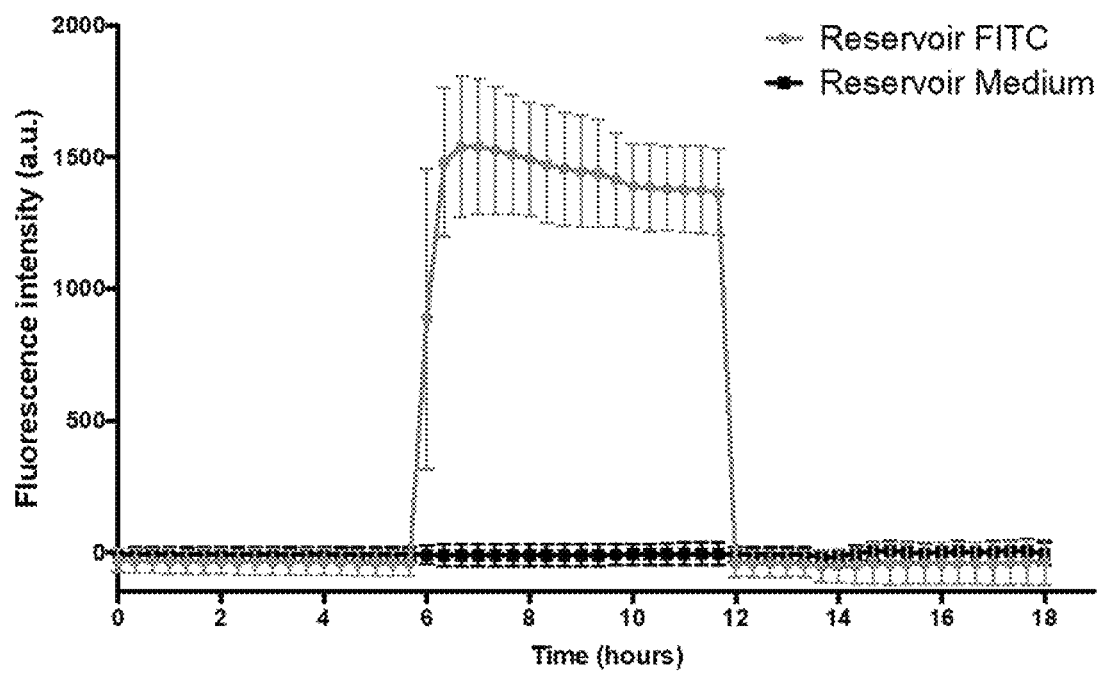
FIG. 7: Time-lapse microscopy of *Mycobacterium smegmatis* cells grown inside a chamber.

FIG. 7 shows representative time-lapse microscopy images of exponential-phase *Mycobacterium smegmatis* continuously perfused with 7H9 medium for 24 hours. Images were acquired every 20 minutes in phase contrast. Time elapsed is indicated in hours. Scale bar, 10 µm.

Figure 8:
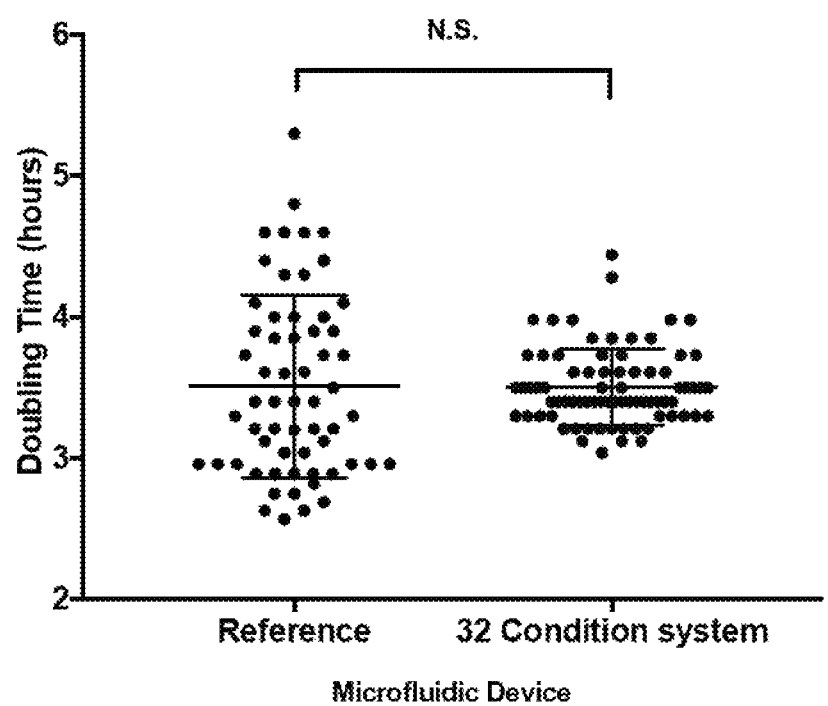
FIG. 8: Fluorescence intensity measured in each lower compartment (growth chamber) of the 32-condition device.

FIG. 8 shows fluorescence intensity measured in each lower compartment of the 32-conditions platform. The 32 conditions were split into two groups of 16 conditions each, based on the solutions contained in the built-in reservoirs. Half of the reservoirs contained medium and the other half contained an FITC solution (100 mM) following an alternated pattern. The average fluorescence intensity and standard deviation were calculated and plotted for each group at each time point. The fluorescence in each chamber was measured every 20 minutes for 18 hours. The excitation wavelength used was 475 nm and the emission wavelength was 525 nm. The values from the group connected to FITC reservoirs are shown in grey, whilst the values from the other medium group are shown in black. The aim was to control the injection sequence to be used for drug screening. The injection sequence was composed of three consecutives six-hour phases. In the first phase, 7H9 medium was injected for bacterial pre-growth. In the second phase, bacteria were exposed to the drugs contained in the reservoirs. Bacteria were exposed to a different drug in each chamber. In the third phase, 7H9 medium was injected again for the bacterial recovery. In this control experiment, the drugs were replaced by medium or FITC solution in order to check timing of injection and assess the presence of any cross-contamination between conditions.

During the first phase, medium was injected in all the chambers by the common inlet. In the second phase, the solutions (either medium or FITC) contained in the reservoirs were injected into the chambers. Then, in the third phase, the medium was injected again by the common inlet.

In phase 1 (0 to 6 h), no fluorescence signal was detected in all conditions, confirming that the solutions were contained in the reservoirs. In phase 2 (6 to 12 h), in the chambers fed with FITC solution, the fluorescence signal was detected, confirming that the switch from the common network to the reservoirs was successful. The fluorescence signal standard variation was around 16% of the average signal showing that the solutions from the reservoirs were evenly injected in the chambers. No fluorescence signal was measured in the chambers connected to reservoirs containing medium, showing that there were no cross-contamination between the chambers. In phase 3 (12 to 18 h), no fluorescence was detected in the chambers. Thus, the switch back to medium injection via the common fluidic network was successful without any cross-contamination. This graph shows that the drug injection sequence has been controlled for 18 hours within a six-hour exposure of the drugs contained in the reservoirs.

Figure 9:
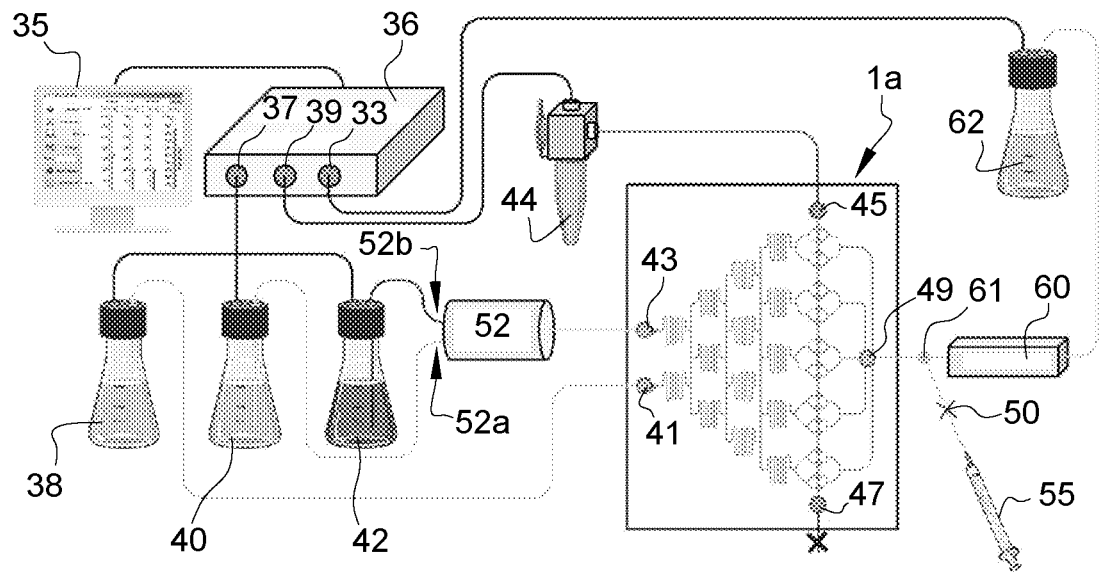
FIG. 9: The doubling time of *Mycobacterium smegmatis* colonies measured in two microfluidic devices.

FIG. 9 shows the doubling time of *Mycobacterium smegmatis* colonies measured in two microfluidic devices. Bacteria were grown in a monolayer and fed with 7H9 medium. The doubling time is the time needed for a colony to double its area. Time-lapse microscopy was performed over 18 hours with a picture of each colony taken every 20 minutes. A reference device described in the published article, Dhar N. & Manina G., 2015, was used for comparison purposes. The aim was to compare the doubling time between the 32-conditions device and the reference device. 60 colonies were monitored in the reference device and 74 for the 32-conditions device. The average doubling time was 3.5 hours in both devices. As there was no significant difference in the doubling time between the two systems, it was concluded that the new 32-condition device was suitable for 2D bacterial growth, as well as for time-lapse microscopy.

Figure 10:
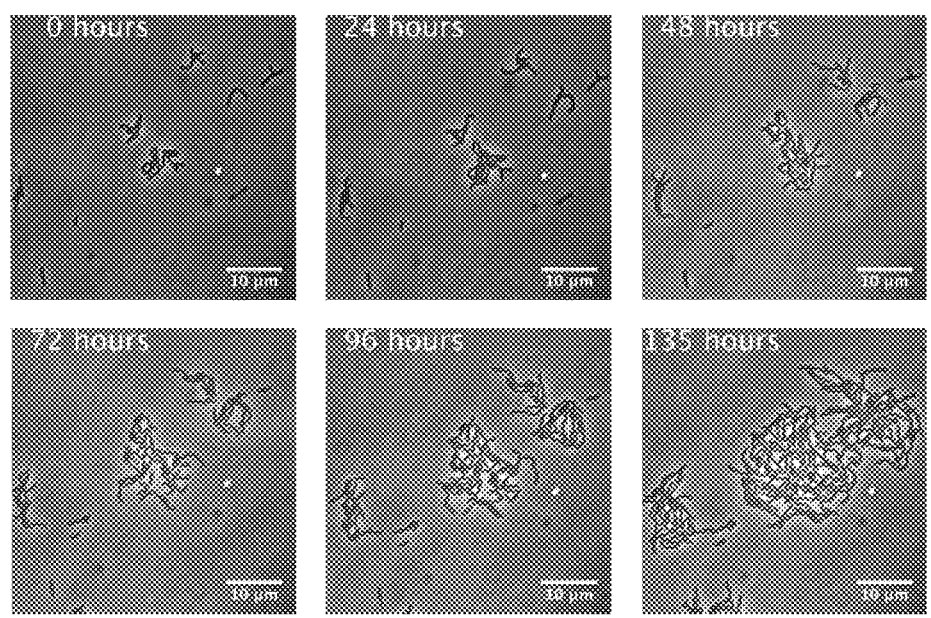
FIG. 10: Schematic of the 5-condition platform set-up, adapted to Biosafety Level 3 laboratory.

FIG. 10 shows the set-up of the 5-condition device adapted to Biosafety Level 3 laboratory. The loading of the device 1a is carried out inside a biosafety cabinet and, once the whole platform is assembled and secured, it is transferred to the microscope stage. A syringe 55 containing the bacterial suspension (e.g., *M. tuberculosis*), is connected to the chip, via a Y-connector 61 and locked by means of pliers 50, to prevent contamination from the bacterial suspension. To load the bacterial suspension into the device 1a, the pliers 50 are removed and used to lock the access to the flowmeter 60. The bacteria are gently injected into the lower fluidic compartment. Once the operation is terminated the tubing connected to the syringe is closed with pliers 50. To trap the cells in the culture chamber, the membrane is actuated with water from the pressure controller 36. Then, the liquid medium in the presence or absence of the drug, stored in reservoirs 38, 40, and 42 is perfused into the lower fluidic compartment, following actuation of the pressure controller 36, and ultimately is collected into the sealed trash 62. The trash 62 is also connected to the pressure controller 36 via an independent outlet channels 33. This enables to maintain the whole set-up under controlled pressure and to avoid bubble formation in the fluidic circuits.

Figure 11:
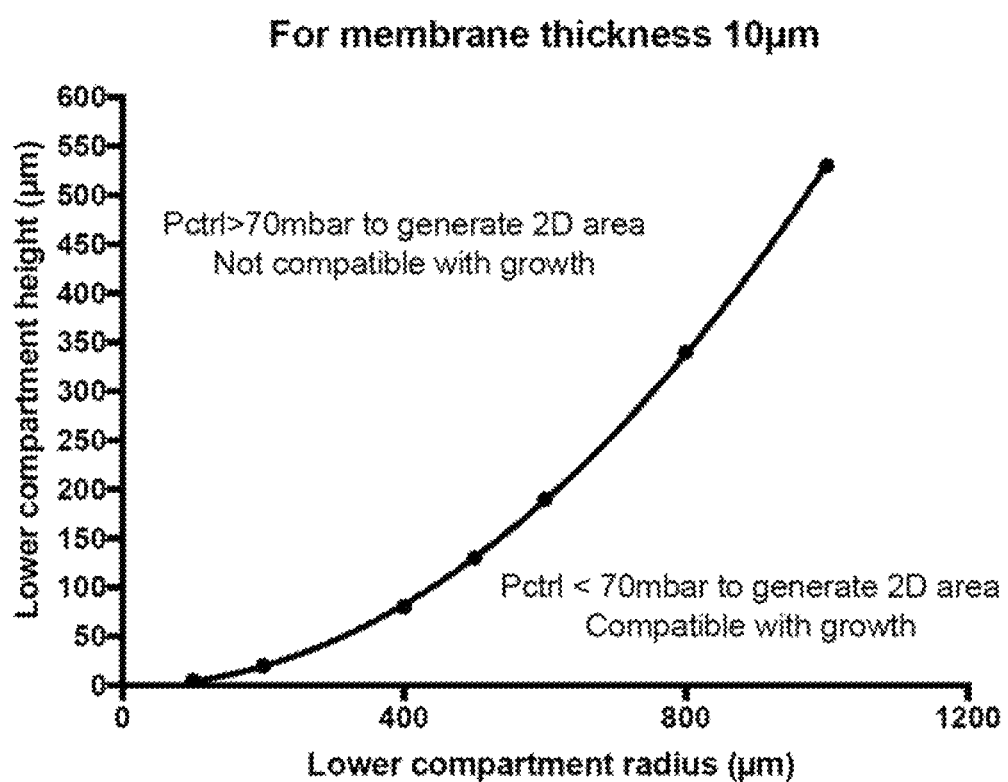
FIG. 11: Time-lapse microscopy of *Mycobacterium tuberculosis* grown inside a chamber of the 5-condition platform.

FIG. 11 shows representative time-lapse microscopy images of exponential-phase *Mycobacterium tuberculosis* continuously perfused with 7H9 medium for 135 hours. Images were acquired every 3 hours in phase contrast. Time elapsed is indicated in hours. Scale bar, 10 µm.

Figure 12A:
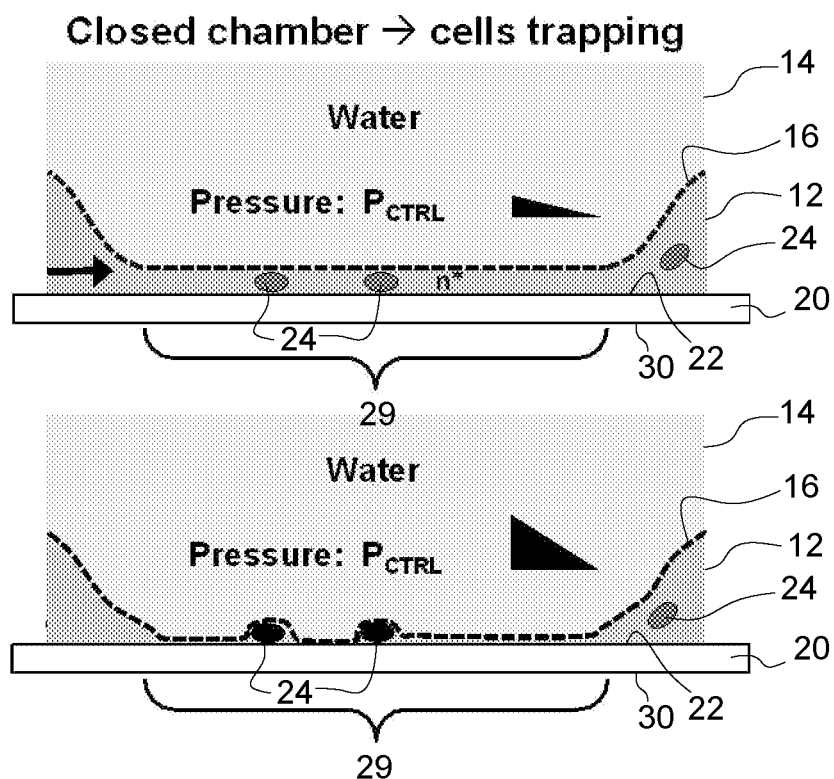
FIG. 12: Determination of the highest acceptable height ($H_c$max) of lower compartment at various radii of lower compartment that is compatible with monolayer bacterial growth, for a membrane thickness of 10 µm.
Figure 12B:
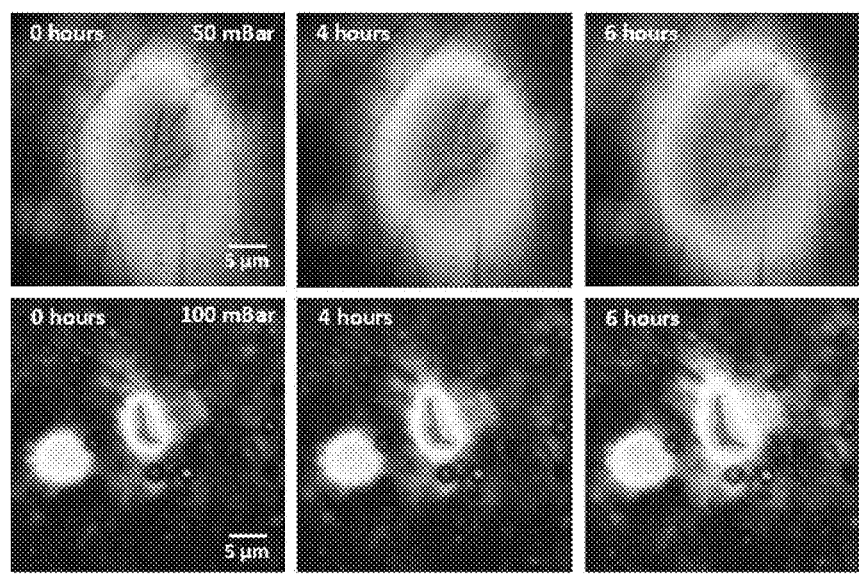

FIG. 12 shows a plot of minimum heights of lower compartment ($H_c$) at various lower compartment radius radii (Rc) for which Pctrl>70 mbar. A non-linear regression has been performed from a second order polynomial model, using Prism 7, GraphPad software. The coefficient of correlation obtained is 0.9999.

FIG. 13A shows a schematic side view of the culture chamber when the PDMS membrane is actuated at a low $P_{CTRL}$ to trap bacteria and form a nanolayer (n*) of liquid medium (upper panel), which is compatible with cell growth, as compared with direct contact between the membrane 16 and the bottom of the lower compartment 12 at a high $P_{CTRL}$ (lower panel), which is incompatible with cell viability. The liquid nanolayer is essential for medium circulation and normal growth of bacteria in the 2D area 29. If the pressure applied is too high the nanolayer breaks and the membrane (e.g., PDMS) adheres to the bottom of the lower compartment 12, i.e. the top surface 22 of the third layer 20 (e.g., glass coverslip), preventing cells from growing.

FIG. 13B shows time-lapse image stacks of the growth of *Mycobacterium smegmatis* within the 2D area of two identical devices (each corresponding to the three upper images and the three lower images) at different pressures ($P_{CTRL}$) applied on the PDMS membrane in the upper compartment. $P_{CTRL}$ of 50 mBar lowers the PDMS membrane, enabling the formation of the nanolayer of liquid medium (whitish shadow), which is compatible with normal cell growth. At $P_{CTRL}$ of 100 mBar (lower images), the PDMS membrane (black, white arrow) sticks to the glass, trapping the bacteria and breaking the nanolayer of liquid (light shadow), and cell growth is impaired. Phase contrast and medium reflection are merged. Scale bar, 5 µm.

EXAMPLES

Example 1: Examples of Materials Used for Microfluidic Device Fabrication and Assembly Silicon Wafer Mold Preparation
1. Plastic Mask.
2. Silicon wafer 100 mm diameter.
3. SU8-2100 photoresist, MicroChem.
4. SU8-2025 photoresist, MicroChem.
5. Hot plate.
6. Spin coater, Suss MicroTec.
7. Mask aligner, e.g., MJB4, Suss MicroTec.
8. Propylene Glycol Methyl Ether Acetate (PGMEA).
9. Isopropyl Alcohol.
10. Scotch Magic Tape.
11. Silanizing agent (trichloro perfluorooctyl silane).
12. Glass slide.
13. Vacuum chamber.
14. Scotch Magic Tape.

Fabrication of the First and Second Elements and their Assembly
1. Polydimethylsiloxane (PDMS), heat-curable silicone elastomer (Sylgard 184, Dow Corning).
2. Plastic cup, 100 mL.
3. Glass round Petri dish, 120 mm diameter.
4. Spincoater, SCS, 6800.
5. Vacuum chamber.
6. Baking oven.
7. Surgical scalpel blade.
8. Biopsy punch, e.g., Harris Uni-Core™—1.20 mm outer diameter (OD).
9. Broad flat-tip forceps used for handling filters, wafers and coverslips.
10. Metallic connector 0.8-1.2 mm inner-outer diameter.
11. Scotch Magic Tape.
12. Aluminum foil.
13. Sterile glass Petri dish, 70 mm diameter.
14. Two custom-made reservoirs in aluminium (84×23×10 mm), Drug Reservoir Controllers (DRC) 78 and 80, with 16 holes (Ø 8 mm) per piece aligned with the 32-condition platform.

Bonding of the First and Third Elements
1. Large coverslip (40×62×0.175 mm), TED PELLA, INC (for 5-condition platform).
2. Large coverslip (76×89×0.2 mm), TED PELLA, INC (for 32-condition platform).
3. Glass slide (50×75×1 mm) (for 32-condition platform).
4. Oxygen plasma.
5. Isopropanol.
6. 70% ethanol.
7. Compressed air.
8. Kimtech paper.
9. 5 µm filter with female Luer Stub adaptor, Millipore.

Example 2: Examples of Materials Used for Bacterial Culture Preparation

1. For mycobacteria prepare Albumin Dextrose Saline enrichment (ADS) composed of 5% (w/v) Bovine Serum Albumin (Fraction V), 2% (w/v) d-glucose, 0.81% (w/v) NaCl in deionized water.
2. For mycobacteria use Middlebrook 7H9 broth (Difco) supplemented with 0.5% glycerol, 0.05% Tween80 and 10% ADS.
3. 30 mL square PETG media bottles (Nalgene).
4. 10 mL syringes.
5. 500 mL filtration unit.
6. 5 µm filter with female Luer Stub adaptor, Millipore.
7. Water bath.
8. Hot plate.
9. Spectrophotometer.

Example 3: Examples of Materials Used for Medium and Tubing Preparation

1. Degassed medium.
2. Pressure tubing: Thick Tygon tubing 1.6 mm inner diameter (ID), BioRad.
3. X-shape and Y-shape PVDF connectors—1.6 mm ID tubing.
4. PVDF Adaptor: Male Luer Integral Lock ring to 200 series Barb, 1.6 mm ID tubing, e.g. MTLL210-J1A Nordson MEDICAL.
5. Female Luer Stubs, 0.8-1.2 mm (inner-outer diameter).
6. Closed male Luer-Lock.
7. 1.8 mL Eppendorf tubes.
8. 50 mL Falcon tubes.
9. Metallic pressure cap, Fluigent.
10. Plastic pressure cap, Fluigent.
11. TFE Teflon tubing 0.76-1.65 mm (inner-outer diameter), Supelco.
12. Tygon tubing 0.5-1.5 mm (inner-outer diameter), Cole Parmer.
13. Silicone tubing, 0.8-1.7 mm (inner-outer diameter), e.g., Silastic, Dow Corning.
14. 0.20 µm Filter with female Luer Stub adaptor, Millipore.
15. Pressure metallic caps for 2 mL tubes.
16. Glass Petri dish.
17. Aluminum foil.
18. Pressure controller, e.g., Microfluidic Flow Control system, Fluigent.

19. Pressure regulator software, e.g., MaesFlow software, Fluigent.
20. 2 to 10 way Bi-directional valve, e.g., M-Switch, Fluigent.
21. Bi-directional valve controller, e.g., Switch Board, Fluigent.
22. Bi-directional valve controller software, e.g., ESS Control software, Fluigent.
23. Plastic syringe, 50 mL.
24. Drug solution, concentrated 4-fold the final working solution.
25. Computer with updated Windows operating system.
26. Metallic connector 0.8-1.2 mm (inner-outer diameter).
27. Metallic pliers.

Example 4: Examples of Materials Used for Cell Seeding and Mounting

1. Nylon screws, e.g., Craftech Industries.
2. Customized metal-acrylic holder equipped with screws, suitable for mounting the 5-condition platform on the microscope stage.
3. Customized metal-acrylic holder equipped with screws and a male Luer, suitable for mounting the 32-condition platform on the microscope stage.
4. Plastic syringe, 1 mL.
5. Flowmeter, e.g., Fluigent.
6. Flow-rate control module algorithm license, e.g., Fluigent.
7. Immersion oil.
8. Biocidal disinfectant.
9. Sealed waste receptacle.

Example 5: Examples of Materials Used for Live Microscopy Imaging

1. Inverted light/epifluorescence microscope, e.g., DV Elite, GE Healthcare.
2. Environmental chamber with controllable air flow for temperature control on the sample area.
3. Customized metallic holder to steadily mount the microfluidic platform on the microscope stage.
4. sCMOS Camera with high resolution and sensitivity, e.g., 16.6×14 mm imaging area, 6.5×6.5 µm pixel size, readout speed 95 and 286 MHz, dynamic range 15 bit.
5. Motorized stage for multisite visiting, with a minimum travel distance of 20 mm (X)×70 (Y) mm, and a resolution step of 10 nm (X,Y,Z).
6. Hardware-based autofocus using a 785 nm laser, in conjunction with a software-based autofocus.
7. Shock-absorbing table.
8. Solid-state lighting system, e.g., 7 excitation wavelengths and corresponding emission filters, 3 polychroic beam splitters and 7-position eyepiece module (GE Healthcare/Lumencolor).
9. Olympus 100× immersion oil phase-objective, UPLFL 1.30 NA, 0.2 mm WD.
10. Computer-based microscope controller for accurate motion control of the motorized components.
11. Workstation endowed with software for experimental design and image processing, e.g., softWoRx 6 (GE Healthcare).

Example 6: Examples of Materials Used for Image Analysis

Latest ImageJ version (1.51 s) bundled to Java 1.8.0 (Wayne Rasband, NIH, USA, https://imagej.nih.gov/ij/).

Example 7: Silicon Wafer Molds Preparation for 5- and 32-Condition Platforms

The following procedure was used to prepare the mold for the first element (herein referred to as FL-W1):
1. Turn on the Mask aligner.
2. Stick the plastic mask on a carrier glass mask using Scotch tape.
3. Dehydrate the wafer by heating for 30 min at 200° C. on a hot plate.
4. Gently place the wafer in the spin coater holder and dispense 1 ml of SU8-2025 photoresist on the wafer surface.
5. Spin at 3000 rpm for 30 seconds to obtain a 30 µm thick layer.
6. Soft-bake the coated wafer for 2 min at 65° C., followed by 4 min at 95° C. on a hot plate.
7. Expose the coated wafer for 14 sec to UV light (155 mJ/cm2) using the Mask aligner.
8. Post Exposure-bake the wafer for 1 min at 65° C., followed by 4 min at 95° C. on a hot plate.
9. Develop the wafer for 5 min in 10 mL of PGMEA.
10. Wash the wafer with isopropyl alcohol.
11. Hard-bake the wafer 2 hours the wafer at 180° C. on a hot plate.
12. Put the wafer on a support inside a vacuum chamber, place a glass slide with 2 drops of silanizings agent on its side, and apply the vacuum overnight.

The following procedure was used to prepare the mold for the second element (herein referred to as CL-W2):
1. Turn on the Mask aligner.
2. Stick the plastic mask on a carrier glass mask using Scotch tape.
3. Dehydrate the wafer by heating for 30 min at 200° C. on a hot plate.
4. Gently place the wafer in the spin coater holder and dispense 1 ml of SU8-2100 photoresist on the wafer surface.
5. Spin at 3000 rpm for 30 seconds to obtain a 100 µm thick layer.
6. Soft-bake the coated wafer for 5 min at 65° C., followed by 20 min at 95° C. on a hot plate.
7. Expose the coated wafer for 21.8 sec to UV light (240 mJ/cm2) using the Mask aligner.
8. Post Exposure-bake the wafer for 5 min at 65° C., followed by 10 min at 95° C. on a hot plate.
9. Develop the wafer for 15 min in 10 mL of PGMEA.
10. Wash wafer with isopropyl alcohol.
11. Hard-bake the wafer 2 hours the wafer at 180° C. on a hot plate.
12. Put the wafer on a support inside a vacuum chamber, place a glass slide with 2 drops of silanizing agent on its side, and apply the vacuum overnight.

Example 8: Fabrication of the First and Second Elements and their Bonding

The following steps were carried out for fabricating the 5- and 32-condition platforms using PDMS for the first and second elements:

1. Prepare a PDMS mixture 1:20 (v:v) by combining 20 g of pre-polymer base with 1 g of Sylgard 184 curing agent, in a plastic cup.
2. Prepare a PDMS mixture 1:5 (v:v) by combining 40 g of pre-polymer base with 8 g of Sylgard 184 curing agent.
3. Mix the reagents using a sterile spreader until they are well blended and assume a foamy appearance.
4. Degas the mixtures by using a vacuum chamber. After venting the chamber repeatedly at the beginning, keep the vacuum for at least half an hour until the air bubbles have been completely evacuated.
5. Place the FL-W1 on the spin coate.
6. Pour the 1:20 (v:v) PDMS mixture onto the FL-W1 and spin at 1000 rpm for 60 seconds, to obtain a 40 um thick layer.
7. Incubate the FL-W1 at room temperature for 20 min on a flat surface.
8. Place the FL-W1 on a hot plate at 80° C. for 18 min.
9. Secure the CL-W2 to the bottom of a square petri dish using Scotch tape.
10. Pour the 1:5 (v:v) PDMS mixture onto the CL-W2, and incubate the petri dish at 60° C. for 30 min to cure the PDMS.
11. Remove the mold from the oven and let it cool to room temperature for 5 min.
12. Incise the cured PDMS around the patterned area of the second element with a scalpel and gently separate it from the CL-W2 so as not to damage it.
13. Using the biopsy punch (1.2 mm OD), punch out the two rounded extremities of the PDMS block containing the control-layer structure from the topside, to generate the inlet ports 41 and 43 and the outlet port 49 or the inlet ports 71 and 73 and the outlet port 86 (FIG. 2; FIG. 3).
14. Remove the possible PDMS debris from the second element using Scotch Magic Tape.
15. Align the round structures of the second element on the round structures of the first element, still sitting on FL-W1, and remove the bubbles by gently pressing the second element with the fingertips.
16. Plug the metallic connectors inside the inlet and outlet ports of the second element.
17. Take the FL-W1 containing the merged PDMS blocks of the first and second element and place this first assembly inside a glass petri dish covered with aluminum foil.
18. Prepare a PDMS mixture 1:10 (v:v) by combining 10 g of pre-polymer base with 1 g of Sylgard 184 curing agent.
19. Mix the reagents until using a sterile spreader until they are well blended and assume a foamy appearance.
20. Degas the mixtures by using a vacuum chamber.
21. Pour the 1:10 PDMS mixture on the first assembly in FL-W1, to generate a support matrix that compacts the two layers and avoids delimitation.
22. Incubate the petri dish at 80° C. overnight to firmly fuse the second element to the first element and to crosslink matrix around.
23. Unplug metallic connectors from the inlet and outlet ports of the control-layer.
24. Using a scalpel cut out the PDMS around the patterned area and gently peel off the final PDMS assembly from FL-W1, avoiding damaging the wafer.

For the 5-Condition Platform:
1. Using a scalpel adjust the size of the final PDMS assembly to 60×40 mm to fit the size of the coverslip without damaging the microchannels.
2. Using the biopsy punch (1.2 mm OD), punch out the final PDMS assembly in correspondence of the inlet and outlet ports 41, 43, and 49 of the first element and crossing both the first and the second elements (FIGS. 2 and 5).

For the 32-Condition Platform:
1. Using a scalpel adjust the size of the final PDMS assembly to 76×89 mm to fit the size of the coverslip without damaging the microchannels.
2. Using the biopsy punch (1.2 mm OD), punch out holes in the final PDMS assembly in correspondence of the inlet, outlet and reservoir ports 71, 73, 83, 84, and 86 of the first element and crossing both the first and the second elements (FIGS. 3 and 4).

Example 9: Bonding of the First and Third Elements (PDMS-Glass Bonding)

The following procedure was used to bond the first element (PDMS) and the third element (glass):
1. Rinse a coverslip first with 70% ethanol and then with isopropanol, and wipe it with Kimtech paper to remove possible traces of grease. (For the 5-condition platform use 40×60×0.175 mm coverslip and for the 32-condition platform use 76×89×0.2 mm coverslip)
2. Blow compressed air onto the coverslip to remove any paper residue.
3. Run the oxygen plasma a first time to clean the chamber as follows: close the door; activate the vacuum; inject the oxygen until the pressure drops to 0.1 mbar; adjust the pressure at 0.25 mbar; start the plasma for 120 sec (the color of the plasma has to be pale blue). At the end of the cycle, break the vacuum and open the door.
4. Place the coverslip and the PDMS assembly, with the microchannels facing upwards, inside the oxygen plasma chamber, on a Teflon holder.
5. Run the oxygen plasma as follows: close the door; activate the vacuum; inject the oxygen until the pressure drops to 0.1 mbar; adjust the pressure at 0.25 mbar; start the plasma for 60 sec. At the end of the cycle, break the vacuum and open the door.
6. Turn the activated side of the PDMS assembly upside down and place it on the activated coverslip, while gently pressing the PDMS with the fingertips to remove possible air bubbles. This step triggers the bonding between the PDMS and the glass.
7. Incubate the assembly at 80° C. overnight to complete the bonding.

For the 5-Condition Platform for Biosafety Level 2 and 3 Experiments:
1. Under a laminar flow, store the PDMS-glass assembly in a sterile Petri dish. Cover the Petri dish with an aluminum film. Incubate all at 80° C. for 24 hours to maintain the sterility.
2. Store the PDMS-glass assembly inside a vacuum chamber until use (FIG. 5).

For the 32-Condition Platform:
1. Prepare two 5 cm Tygon tubing. Plug one extremity to a Luer connector and the other end to a curved metallic connector.
2. Then, plug these metallic connectors into the inlet ports and common outlet port of the chip. Put a drop of PDMS around the metallic connectors to seal the system. Incubate the assembly at 80° C. for 2 hours to cure the sealing.

Figure 6:
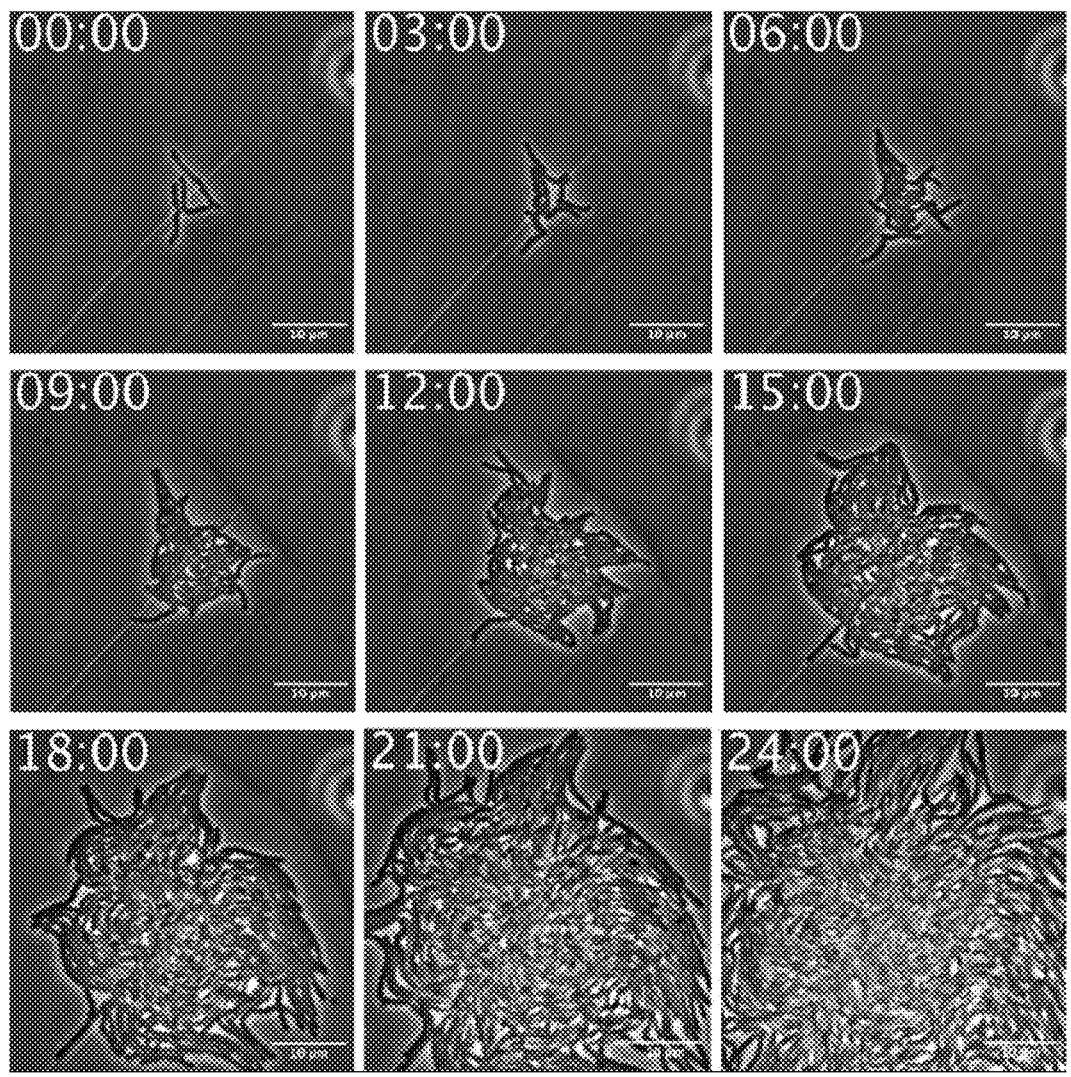

Example 10: Integration of the Fourth and Fifth Elements for the 32-Condition Platform The following procedure was used to integrate the fourth and fifth elements on the first face of the second element for the 32-condition platform:
1. Prepare a PDMS mixture 1:10 (v:v) by combining 10 g of pre-polymer base with 1 g of Sylgard 184 curing agent.
2. Mix the reagents until using a sterile spreader until they are well blended and assume a foamy appearance.
3. Degas the mixtures by using a vacuum chamber.
4. Fill a 5 ml syringe with the PDMS mixture and connect a Luer stub on it.
5. Plug metallic connectors in all ports of the 32-condition platform 1b.
6. Using the syringe, gently pour the PDMS around the 32 metallic connectors of the device. On each side of the device, align carefully the 16 reservoirs of the DRC 78 and 80 with the 16 metallic connectors on the device, then stick the DRC 78 and 80 on the surface of the device.
7. Incubate the platform at 80° C. for 30 min to cure the PDMS, which will form a watertight barrier (FIGS. 3 and 6).
8. Unplug all the 32 metallic connectors from the ports.
9. Store the PDMS-glass assembly inside a vacuum chamber until use.

Example 11: Preparation of the Mounting Medium and Mycobacterial Single-Cell Suspension The following procedure was used to prepare the mounting medium and Mycobacterial suspension:
1. Filter the 7H9 medium in a filtration unit, degas it for 2 hours, and pre-warm it at 37° C. in water bath.
2. Inoculate 6 mL of complete 7H9 medium in a 30 mL bottle with a mycobacterial glycerol stock solution diluted at least 50 times.
3. Incubate the primary culture at 37° C. in shaking conditions at 100 rpm for 24 h (if fast-growing species) or for 7 days (if slow-growing species).
4. Use the primary culture to inoculate a fresh culture and incubate it until it reaches mid-exponential phase (OD600 nm=0.5-0.8).
5. Pre-wet a 5-μm filter with 1 mL of 7H9 medium and discard the liquid.
6. Pass 1 mL of bacterial suspension through the equilibrated filter to eliminate bacterial clumps and collect the filtrated bacteria in a new tube.

Example 12: Preparation of Bubble Traps and Tubing Connections

The following procedure was used to prepare bubble traps and tubing connections:
Bubble Trap:
Two bubble traps were fabricated for the 5-condition platform 1a and one bubble trap was fabricated for the 32-condition platform 1b.
1. Connect two PVDF adaptors to the extremities of a pressure tubing 2 cm long.
2. Connect two male Luer connectors to the extremities of the two PVDF adaptors.
3. Connect one end of 4 cm long Tygon tubing to one bubble trap (54 or 56 or 76) extremity and the other end to a curved metallic connector (FIGS. 2 and 3).

Tubing Connections for 5-Condition Platform for Biosafety Level 1 and 2:
1. Fill two tubes with 1.8 mL of medium and one tube with 1.8 mL of drug solution (4-fold concentrated). Close the two medium tubes and the drug tube, from now on called reservoirs, with metallic caps.
2. Screw a 0.2 μm filter on the air inlet of each metallic cap.
3. To control the three reservoirs from the same channel of the pressure controller, connect four 20-cm pressure tubing to an X connector. Connect three tubing to the metallic caps of the reservoirs and the fourth tubing to channel 37 of the pressure controller.
4. Place the tubing, bubble traps and connectors inside a glass Petri dish, cover with aluminum and sterilize by autoclaving at 121° C. for 20 min. From now on work under a laminar flow hood.
5. Connect one end of 50 cm long Teflon tubing to a bubble trap, and the other end to a pressure metallic cap, which is used to close a medium reservoir 38. Close the tubing on the bubble trap side using pliers (FIG. 2A).
6. Connect one extremity of two Teflon tubing to the M-Switch 52 inlets 52a and 52b, and the other extremity to the pressure metallic caps. The inlet 52a must be connected to the medium reservoir 40 and the inlet 52b to the drug reservoir 42, respectively (FIG. 2A).
7. Connect one extremity of a third Teflon tubing to the central outlet of the M-Switch 52, and the other extremity to a second bubble trap. Here, the medium reservoirs 38 and 40 are connected to the M-Switch 52 and then to the same outlet tubing. Close this tubing on the bubble trap using pliers. Place the M-Switch 52 and the three reservoirs 38, 40, 42 inside the microscope environmental chamber.
8. Plug the pressure tubing of the three reservoirs 38, 40, 42 into the Channel 37 of the pressure controller.
9. Select the pressure at a value of 10 mbar.
10. Open the plier on the tubing connected to the medium reservoir 38 until the tubing and the bubble traps are filled, and then stop the flow on the bubble trap using pliers.
11. By using the ESS software, select the M-Switch in position 2. Open the plier on the tubing connected to the medium reservoirs 38 and 40 and inject the drug solution at 10 mbar. Once you observe the drug reaching the M-Switch, switch to position 1 and inject the medium for 20 min at 10 mbar to wash out the drug, then stop the flow with pliers.
12. To fine-tune the movement of the PDMS control-layer, fill a tube with 2 mL of sterile water and close it with a pressure metallic cap (water reservoir 44). Connect one end of a 50 cm Tygon tubing to the pressure metallic cap and the other end to a metallic connector.
13. Plug the metallic cap of the water reservoir 44 to the Channel 39 of the pressure controller and place the water tube inside the environmental chamber of the microscope.

Tubing Connections for 5-Condition Platform for Biosafety Level 3:
1. Fill two tubes with 1.8 mL of medium and one tube with 1.8 mL of drug solution (4-fold concentrated). Close the two medium tubes and the drug tube, from now on called reservoirs, with metallic caps.
2. Screw a 0.2 µm filter on the air inlet of each metallic cap.
3. To control the three reservoirs 38, 40 and 42 from the same channel 37 of the pressure controller 36, connect four 20-cm pressure tubing to an X connector. Connect three pressure tubing to the plastic caps of the reservoirs and the fourth tubing to channel 37 of the pressure controller 36.
4. Place the tubing and connectors inside a glass Petri dish, cover with aluminum and sterilize by autoclaving at 121° C. for 20 min. From now on work under a laminar flow hood.
5. Connect one end of 50 cm long Teflon tubing to a metallic connector, and the other end to a pressure plastic cap, which is used to close a medium reservoir 38. Close the tubing on metallic connector side using pliers (FIG. 10).
6. Connect one extremity of two Teflon tubing to the M-Switch 52 inlets 52a and 52b, and the other extremity to the pressure plastic caps. The inlet 52a must be connected to the medium reservoir 40 and the inlet 52b to the drug reservoir 42, respectively (FIG. 10).
7. Connect one extremity of a third Teflon tubing to the central outlet of the M-Switch 52, and the other extremity to metallic connector. Here, the medium reservoirs 38 and 40 are connected to the M-Switch 52 and then to the same outlet tubing. Close this tubing using pliers. Connect the M-Switch 52 to the M-board.
8. Plug the pressure tubing of the three reservoirs 38, 40, 42 to a 50 mL syringe.
9. Press gently the syringe plunger to increase manually the pressure into the reservoirs.
10. Open the plier on the tubing connected to the medium reservoir 38 until the tubing is filled, and then stop the flow using pliers.
11. By using the ESS software, select the M-Switch in position 2 (inlet 52b). Open the plier on the tubing connected to the medium reservoirs 40 and 42 and inject the drug solution at 10 mbar. Once you observe the drug reaching the M-Switch, switch to position 1 (inlet 52a) and inject the medium manually for 5 min to wash out the drug, then stop the flow with pliers.
12. To fine-tune the movement of the PDMS control-layer, fill a tube with 2 mL of sterile water and close it with a pressure metallic cap (water reservoir 44). Connect one end of a 50 cm Tygon tubing to the pressure metallic cap and the other end to a metallic connector.

Tubing Connections for 32-Condition Platform:
1. Place the TFE & Tygon tubing, bubbles traps, and connectors inside a glass Petri dish, cover with aluminum and sterilize by autoclaving at 121° C. for 20 min. From now on work under a laminar flow hood.
2. Fill a 50 mL tube with 20 mL of medium, close the medium tube with plastic pressure caps, and screw a 0.2 µm filter on the air inlet of the pressure cap.
3. Connect one end of 50 cm long Teflon tubing to Flowmeter 72, and the other end to the medium tube. Then connect the Flowmeter 72 to a bubble trap 76 (FIG. 3).
4. To fine-tune the movement of the PDMS control-layer, fill a tube with 2 mL of sterile water and close it with a pressure metallic cap. Connect one end of a 50 cm Tygon tubing to the pressure metallic cap and the other end to a metallic connector.
5. Plug the metallic caps to the Channel 67 of the pressure controller 64 and place the water tube inside the environmental chamber of the microscope.

Example 13: Cell Seeding and Microscope Mounting

The following procedure was used for cell seeding and microscope mounting:
For the 5-Condition Platform for Biosafety Level 1 and 2:
1. For cell seeding, cut four 5 cm long Tygon tubing and connect one end to a metallic connector and the other end to a Luer stub.
2. Place the assembled Tygon tubing inside a glass Petri dish, cover with aluminum and sterilize by autoclaving at 121° C. for 20 min.
3. Extract the microfluidic platform from the vacuum chamber and, from now on, work in a laminar flow hood.
4. Connect the metallic connectors of two autoclaved Tygon tubing to the two inlets of the microfluidic platform, and the other extremities of the Tygon tubing to 0.2 µm filters to maintain sterility.
5. Fill a syringe with 1 mL of bacterial suspension. Connect the syringe to the outlet 49 of the platform via the Luer.
6. Manually inject the bacterial suspension from the outlet side of the platform, very slowly until the microchannels are completely filled, and incubate at 37° C. for 20 min.
7. To avoid contamination after cell seeding, prepare a Tygon tubing 10 cm long, and plug to each extremity a PVDF adaptor. On one end, attach a filter, which in turn is connected to a Luer connector.
8. After having perfused the bacterial suspension, unplug the syringe and in its place plug the PVDF adaptor of the Tygon tubing, and spray the connection with disinfectant. Then plug the flowmeter 60 to the Luer connector of the Tygon tubing, on the filter side, to avoid contamination (FIG. 2).
9. Bring back the M-Switch 52 and the reservoirs 38, 40, and 42 under the laminar flow hood and connect them to the microfluidic platform 1a.
10. Plug the outlet 49 of the platform 1a into the flowmeter 60 and, using sterile tubing, connect in turn the flowmeter 60 to a sealed waste receptacle 62.
11. Connect one inlet 41 to the medium reservoir 38 and the other inlet 43 to the M-Switch 52 (FIG. 2A).
12. Once the system assembly 1a is completely isolated, transfer it inside the microscope environmental chamber.
13. Add one drop of immersion oil on the objective and spreads a generous amount of oil over the entire surface of the coverslip without generating bubbles.
14. Mount steadily the system assembly 1a on the microscope stage using the dedicated holder, and check the stability by pushing the platform 1a with your fingers.
15. Connect the medium reservoirs 38 and 40, and the drug reservoir 42 to the Channel 37 of pressure controller 36 and wash the platform 1a for 20 min at 200 mbar.

16. Connect the control-layer inlet 45 to the water reservoir 44, close the control-layer outlet 47 tubing using pliers. Connect the water reservoir 44 to channel 39 of the pressure controller 36 set at 30 mbar.
17. Once all air bubbles have been evacuated, start the flow at a rate of 120 µl·h−1.
18. Start live imaging (Example 14).
19. After the cells have gone through 2 to 3 generations, switch the M-switch 52 in position 2 to inject the drug from the drug reservoir 42. Once the drug perfusion is terminated, switch the M-switch 52 back to position 1 to washout the drug from the medium reservoir 40. This operation can be repeated if multiple drug exposures are envisaged.

For the 5-Condition Platform for Biosafety Level 3:
1. For cell seeding, cut one 5 cm long Tygon tubing and connect one end to a metallic connector and the other end to a Luer stub. For one Tygon tubing, connect both ends to a metallic connector. Cut two 10 cm long and one 50 cm silicon tubing. Connect an end of each of them to one extremity of a Y-connector. Connect the other end of one 10 cm long tubing to a Luer stub. Close the Luer stub with a plastic cap. Connect the end of the second 10 cm long tubing to a metallic connector.
2. Place the assembled silicon and Tygon tubing inside a glass Petri dish, cover with aluminum and sterilize by autoclaving at 121° C. for 20 min.
3. Extract the microfluidic platform from the vacuum chamber and, from now on, work in a laminar flow hood.
4. Connect the metallic connectors of the autoclaved Tygon tubing to the two inlets of the microfluidic platform, to close the device and to maintain sterility. Connect the metallic connector of silicon tubing to the outlet of the microfluidic platform.
5. Fill a syringe with 1 mL of bacterial suspension. Remove the plastic caps of the Luer stub. Connect the syringe 55 to the outlet 49 of the platform via the Luer stub. Close the 50 cm long silicon tubing with pliers 50, to maintain the tubing clean for bacterial suspension.
6. Press gently the syringe plunger and manually inject the bacterial suspension from the outlet side of the platform, very slowly until the microchannels are completely filled, and incubate for 20 min.
7. After having perfused the bacterial suspension, unplug the syringe and in its place plug the plastic cap, and spray the connection with disinfectant.
8. Plug the flowmeter 60 to the end of the 50 cm long silicon tubing (outlet 49). Unplug the Tygon tubing connected to the inlets of the microfluidic platform.
9. Connect the M-Switch 52 and the reservoirs 38, 40, 42 to the microfluidic platform 1*a*.
10. Using a sterile tubing, connect the flowmeter 60 to a sealed waste receptacle 62 containing mycobactericidal disinfectant.
11. Connect one inlet 41 to the reservoir 38 and the other inlet 43 to the M-Switch 52.
12. Once the system assembly 1*a* is completely isolated, transfer it inside the microscope environmental chamber.
13. Add one drop of immersion oil on the objective and spread a generous amount of oil over the entire surface of the coverslip without generating bubbles.
14. Mount steadily the system assembly on the microscope stage using the dedicated holder, and check the stability by pushing the platform with fingers.
15. Connect the medium reservoirs 38 and 40, and the drug reservoir 42 to the Channel 37 of the pressure controller 36 and wash the platform 1*a* for 20 min at 200 mbar.
16. Connect the control-layer inlet 45 to the water reservoir 44, close the control-layer outlet 47 tubing using pliers. Connect the water reservoir 44 to channel 39 of the pressure controller 36 set at 30 mbar.
17. Once all air bubbles have been evacuated, start the flow at a rate of 120 µl·h−1.
18. Start live imaging (Example 14).
19. After the cells have divided 2 to 3 times, switch the M-switch 52 in position 2 (inlet 52*b*) to inject the drug from the drug reservoir 42. Once the drug perfusion is terminated, switch the M-switch 52 back to position 1 (inlet 52*a*) to washout the drug from the medium reservoir 40. This operation can be repeated if multiple drug exposures are envisaged.

For the 32-Condition Platform:
1. For cell seeding, cut four 5 cm long Tygon tubing and connect one end to a metallic connector and the other end to a Luer stub.
2. Place the assembled Tygon tubing inside a glass petri dish, cover with aluminum and sterilize by autoclaving at 121° C. for 20 min.
3. Extract the microfluidic platform from the vacuum chamber and, from now on, work in a laminar flow hood. Mount steadily the platform in the dedicated holder, and check the stability by pushing the platform 1*b* with your finger.
4. Fill a syringe with 1 ml of bacterial suspension. Connect the syringe to the outlet 86 of the platform 1*b* via the Luer (FIGS. 4 and 6).
5. Manually inject the bacterial suspension from the outlet side of the platform, very slowly until the microchannels are completely filled, and incubate at 37° C. for 20 min.
6. To avoid contamination after cell seeding, prepare a Tygon tubing 10 cm long, and plug to each extremity a PVDF adaptor. On one end, attach a filter, which in turn is connected to a Luer connector.
7. After having perfused the bacterial suspension, unplug the syringe and in its place plug the PVDF adaptor of the Tygon tubing, and spray the connection with disinfectant. Then plug the Flowmeter 74 to the Luer connector of the Tygon tubing, on the filter side, to avoid contamination (FIG. 3).
8. Put the platform in a sealed box and incubate at 37° C. for 20 min.
9. Take out the platform 1*b* from the incubator. Connect the inlet 71 to the medium reservoir 66, and the outlet of the Flowmeter 74 to a sealed trash 70 (FIG. 3).
10. Connect the medium reservoir to the Channel 65 of the pressure controller 64. Set the pressure to 50 mbar and wash the platform 1*b* for 20 min with medium.
11. Close the outlet with a pliers and fill the reservoirs with medium for 20 min, until a 10 µl droplet is appearing in each reservoir.
12. Using a micropipette, fill each of the 32 different reservoirs with 200 µL of each different drug solution.
13. Screw the two DRCs 78 and 80 tightly on each side of the 32-condition platform 1*b* to seal the system. Add a 0.2 µm filter on the inlet of each DRC 78 and 80 using the Luer connector. Close the inlets with pliers.
14. Once the system assembly 1*b* is completely isolated, transfer it inside the microscope environmental chamber.

15. Add one drop of immersion oil on the objective and spreads a generous amount of oil over the entire surface of the coverslip without generating bubbles.
16. Mount steadily the system assembly on the microscope stage and check the stability by pushing the platform 1b with your finger.
17. Connect medium reservoir 66 to the Channel 65 of pressure controller, set the pressure at 230 mbar.
18. Connect Trash bottle to the Channel 75 of pressure controller 64, set the pressure at 100 mbar.
19. Connect the control-layer inlet 73 to the water reservoir and close the control-layer outlet 83 tubing using pliers.
20. Connect the DRC 78 and 80 to Channel 69 and set the pressure at 105 mbar. Connect the water reservoir 68 to Channel 67 and then set the pressure on 150 mbar.
21. Set the Flowmeter 72 at 44 µl·min−1 and the Flowmeter 74 on 40 µl·min−1.
22. Start live imaging (Example 14).
23. After the cells have gone through 2 to 3 generations, to inject the drugs, set channel 69 on 150 mbar, and the Flowmeter 72 and 74 on 15 µl·min−1 and 40 µl·min−1, respectively.
24. To washout the drugs, set channel 69 on 105 mbar, and the Flowmeter 72 and 74 on 44 µl·min−1 and 40 µl·min−1, respectively. This operation can be repeated if multiple exposures to the drugs are envisaged.

Example 14: Multicondition Live-Cell Imaging

The following procedure was used to carry out multicondition live-cell imaging:
1. Walk with the 100×-phase oil objective through the coverslip area corresponding to the 1 mm diameter microchambers to spread the oil.
2. Look for the focal plane where cells appear well contrasted and mark the x,y coordinates on the point list of the microscope. The total number of points depends on the speed of the microscope and on the imaging frequency. For a frequency of acquisition every 30 minutes, it is necessary not to exceed 300 total points, which means around 55 x,y points per microchambers in the 5-condition platform, and 9 x,y points per microchambers in the 32-condition platform.
3. Once the coordinates have been selected, check that the combination of the hardware and software-based autofocus works properly to automatically find the best focal plane where cells are nicely contrasted.
4. To minimize phototoxicity, choose the fluorescence exposure parameters on points that will not be imaged during the experiment.
5. Set the imaging conditions on the microscope software viz., light and fluorescence exposure intensity and exposure time, imaging frequency, and autofocus parameters.
6. Save the experiment settings and start the automated acquisition.
7. Use a software, such as Image J, for post-processing and single-cell analysis of the image stacks (FIG. 7).

Example 15: Membrane Deformation Calculation

The calculation of the pressure needed to achieve the proper membrane deformation to generate a 2D growth area for imaging cells or bacteria in monolayer has been carried out according to the method described in the article, "X. Quian, & Al., 2016, Characterizing the Deformation of the Polydimethylsiloxane (PDMS) Membrane for Microfluidic System through Image Processing". The following equations have been employed:

$$V = NP^m$$

where V=volume under the membrane deformed, $P^m$=the pressure applied on the membrane, and where m and N are fitting parameters modeled based on their experimental measurement.

The parameters N and m depend on the radius and the thickness of the membrane deformed:

$$N = \frac{R^{3.439}}{36.3915 h^{0.4285}}$$

$$m = 0.4077 + 0.0003718 Rc - 0.1879h + 0.003195 Rc^2 - 0.03158 Rc*h + 8.596 h^2$$

where R=radius of the membrane and h=thickness of the membrane.

These equations have been applied to the microfluidic system according to the invention to calculate the geometry limitation. Two constraints involved are:
- The maximum limit of differential pressure between upper layer and lower layer that is applied on the membrane ($P_{ctrl}$) has to be inferior or equal to 70 mbar. Otherwise, even if the bacteria are maintained in a monolayer, the bacterial growth is impaired.
- A 2D area with a radius of at least 34 µm needs to be formed to carry out the imaging of the formation of at least one bacterial colony for the time required to monitor multiple generation times, for example 6 generation times, which depend of the bacterial species, i.e., 18 hours for *M. smegmatis* and 6 days for *M. tuberculosis*.

Based on these constraints, the maximum lower compartment height ($H_c$max) and radius (Rc) are calculated to generate a 2D area with a radius of at least 34 µm compatible with bacteria growth ($P_{ctrl}$<70 mbar), based on the formula:

$$Pctrl = 10^{\left(\frac{Log10(V) - Log10(N)}{m}\right)}$$

The volume formula to obtain a 2D area with a radius of at least 34 µm is the formula of truncated cone.

For the following calculation, the upper radius of the cone is 34 µm. The base of the cone is the radius of the membrane (R) which is also the radius of the lower compartment ($R_c$), and the height of the cone is the height of the lower compartment ($H_c$), which is the height between the PDMS membrane and the glass without any membrane deformation:

$$V = \frac{\pi}{3} * \left(Rc^2 + 0.034^2 + Rc + 0.034\right) * Hc$$

This volume equation can then be substituted into the pressure ($P_{ctrl}$) equation above to calculate the pressure ($P_{ctrl}$):

$$Pctrl = 10^{\left(\frac{Log10\left(\frac{\pi}{3}*(Rc^2+0.034^2+Rc+0.034)*Hc\right) - Log(N)}{m}\right)}$$

For a given membrane thickness, for example, h=10 µm, m and N values depend only on the lower compartment radius:

$$m=0.4077+0.0003718Rc-0.1879*0.01+0.00319Rc^2-0.3158*0.01*Rc+8.596*0.01^2$$

$$N = \frac{Rc^{3.439}}{36.3915*0.01^{0.4285}}$$

By substituting N and m into the pressure ($P_{ctrl}$) equation, the pressure ($P_{ctrl}$) can be determined based only on the radius of the chamber ($R_c$) and the height ($H_c$), to obtain a 2D area with a radius of 34 µm.

$$Pctrl = 10^{\left(\frac{Log10(\frac{\pi}{3}*(Rc^2+0.034^2+Rc+0.034)*Hc)-Log\left(\frac{Rc^{3.439}}{36.3915*0.01^{0.4285}}\right)}{0.4077+0.0003718\ Rc-0.1879*0.01+0.00319\ Rc^2-0.3158*0.01*Rc+8.596*0.01^2}\right)}$$

From this equation, different values of lower compartment height ($H_c$) and radius ($R_c$) can be generated for a membrane thickness of 10 µm.

The graph in FIG. 12 shows a plot of minimum height of lower compartment ($H_c$) at various lower compartment radii ($R_c$) for which $P_{ctrl}>70$ mbar. A non-linear regression has been performed from a second order polynomial model, using Prism 7, GraphPad software. The coefficient of correlation obtained is 0.9999.

From the non-linear regression, the maximum height allowed ($H_c$max) for a given radius of the lower compartment ($R_c$) can be correlated.

For membrane thickness of 10 µm, the polynomial equation to link the highest acceptable height ($H_c$max) for a given radius that is also compatible with monolayer bacterial growth is determined to be:

$$Hcmax=-0.0126Rc^2-0.01Rc+0.0005411$$

For different thickness of membrane, the equation can be determined, using the same method described herein.

Example 16: Parameters Associated to the Culture Chamber

The parameters associated to the culture chamber are crucial to its working principle, which is the formation of a 2D area compatible with monolayer cell trapping and growth. Cell-life compatibility of the 2D area is dependent on the pressure that is applied on the membrane to be lowered, allowing cell trapping and growth, and on given dimensions and ratios to respect. These parameters are adapted for a range of materials, which offer elastic proprieties close to PDMS, such as PEGDA, Ecoflex, perfluorinated compound, fluorinated polymers, or transparent rubber urethane.

The technical proprieties of the device depend on the following parameters.

The first crucial ratio (Ra) links the diameter (D) to the height (H) of the lower compartment:

$$Ra = \frac{D}{H}$$

where D, H and Ra are comprised between the following values (µm):

$100 \leq D \leq 2000$ $10 \leq H \leq 350$ $15 \leq Ra \leq 30$

The second crucial ratio (Rb) links the membrane thickness (Th) between the upper and the lower compartment to the height of the lower compartment:

$$Rb = \frac{Th}{H}$$

where, Th, H and Rb are comprised between the following values (µm):

$5 \leq Th \leq 100$ $10 \leq H \leq 350$ $0.5 \leq Rb \leq 1.5$

The third crucial ratio (Rc) links the diameter of the culture chamber to the width of the lower inlet and outlet channels (Wch):

$$Rc = \frac{D}{Wch}$$

where, D, Wch and Rc are comprised between the following values (µm):

$100 \leq D \leq 2000$ $20 \leq Wch \leq 500$ $2 \leq Rc \leq 5$

The last crucial ratio (Rd) links the diameter of the upper compartment (Dup) to the diameter of the lower compartment. Rd mainly applies to culture chambers made of PDMS, and aims to facilitate the fabrication process. Moreover, if the upper compartment is made of PDMS, the height of the upper compartment must not be lower than 100 µm, to avoid the membrane sticking to the top of the upper compartment.

$$Rd = \frac{Dup}{D}$$

where, Dup, D and Rd are comprised between the following values (µm):

$100 \leq Dup \leq 2000$ $100 \leq D \leq 2000$ $0.8 \leq Rd \leq 1.2$

REFERENCES

Marusyk, A., and Polyak, K. (2010). Tumor heterogeneity: causes and consequences. Biochim Biophys Acta 1805, 105-117.

Ackermann, M. (2015). A functional perspective on phenotypic heterogeneity in microorganisms. Nat Rev Microbiol 13, 497-508.

Adan, A., Alizada, G., Kiraz, Y., Baran, Y., and Nalbant, A. (2017). Flow cytometry: basic principles and applications. Crit Rev Biotechnol 37, 163-176.

Basiji, D. A. (2016). Principles of amnis imaging flow cytometry. Methods Mol Biol 1389, 13-21.

Thery, M. (2010). Micropatterning as a tool to decipher cell morphogenesis and functions. J Cell Sci 123, 4201-4213.

Silva, A., Jacobson, T., Meads, M., Distler, A., and Shain, K. (2015). An organotypic high throughput system for characterization of drug sensitivity of primary multiple myeloma cells. J Vis Exp, e53070.

Wallberg, F., Tenev, T., and Meier, P. (2016). Time-lapse imaging of cell death. Cold Spring Harb Protoc doi: 10.1101/pdb.prot087395.

Muzzey, D., and van Oudenaarden, A. (2009). Quantitative time-lapse fluorescence microscopy in single cells. Annu Rev Cell Dev Biol 25, 301-327.

Locke, J. C., Elowitz M. B. (2009) Using movies to analyse gene circuit dynamics in single cells. Nature Reviews Microbiology 7, 383-392

Rusconi, R., Garren, M., and Stocker, R. (2014). Microfluidics expanding the frontiers of microbial ecology. Annu Rev Biophys 43, 65-91.

Young, J. W., Locke, J. C., Altinok, A., Rosenfeld, N., Bacarian, T., Swain, P. S., Mjolsness, E., and Elowitz, M. B. (2011). Measuring single-cell gene expression dynamics in bacteria using fluorescence time-lapse microscopy. Nat Protoc 7, 80-88.

Joyce, G., Robertson, B. D., and Williams, K. J. (2011). A modified agar pad method for mycobacterial live-cell imaging. BMC Res Notes 4, 73.

Golchin, S. A., Stratford, J., Curry, R. J., and McFadden, J. (2012). A microfluidic system for long-term time-lapse microscopy studies of mycobacteria. Tuberculosis (Edinb) 92, 489-496.

Dhar, N., and Manina, G. (2015). Single-cell analysis of mycobacteria using microfluidics and time-lapse microscopy. Methods Mol Biol 1285, 241-256.

Dhar, N., and Manina, G. (2015). Single-cell analysis of mycobacteria using microfluidics and time-lapse microscopy. Methods Mol Biol 1285, 241-256.

Shi, H., Colavin, A., Lee, T. K., and Huang, K. C. (2017). Strain library imaging protocol for high-throughput, automated single-cell microscopy of large bacterial collections arrayed on multiwell plates. Nat Protoc 12, 429-438.

Schmidt, G. W., Frey, O., and Rudolf, F. (2018). The cell clamper: A convenient microfluidic device for time-lapse imaging of yeast. Methods Mol Biol 1672, 537-555.

Bai, Y., Gao, M., Wen, L., He, C., Chen, Y., Liu, C., Fu, X., and Huang, S. (2018). Applications of microfluidics in quantitative biology. Biotechnol J 13, e1700170.

Du, G., Fang, Q., and den Toonder, J. M. (2016). Microfluidics for cell-based high throughput screening platforms—A review. Anal Chim Acta 903, 36-50.

Khanafer, K & Duprey, A & Schlicht, M and Berguer, R (2009) Effects of strain rate, mixing ratio, and stress-strain definition on the mechanical behavior of the polydimethylsiloxane (PDMS) material as related to its biological applications. Biomed Microdevices 11, 503-508.

Johnston, I. D., McCluskey, D. K., Tan, C. K. L., and Tracey, M. C. (2014) Mechanical characterization of bulk Sylgard 184 for microfluidics and microengineering. J. Micromech. Microeng. 24, 035017 (7 pp).

De Paoli, F. (2015) Measuring Polydimethylsiloxane (PDMS) Mechanical Properties Using Flat Punch Nanoindentation Focusing on Obtaining Full Contact. *Graduate Theses and Dissertations*

The invention claimed is:

1. A microfluidic device (1a, 1b) comprising a body (3a, 3b) comprising a lower fluidic network (46), an upper fluidic network (48), and at least one cell culture chamber (10), wherein the at least one cell culture chamber (10) is a disc-shaped chamber and comprises:
  a. a lower compartment (12) connected to a lower inlet channel (26) and a lower outlet channel (28), wherein the lower compartment (12), the lower inlet channel (26), and the lower outlet channel (28) are comprised in the lower fluidic network (46);
  b. an upper compartment (14) connected to an upper inlet channel (32) and an upper outlet channel (34), wherein the upper compartment (14), the upper inlet channel (32), and the upper outlet channel (34) are comprised in the upper fluidic network (48); and
  c. a deformable membrane (16) disposed between the lower compartment (12) and the upper compartment (14), wherein the membrane (16) constitutes the top surface of the lower compartment (12) and the bottom surface of the upper compartment (14) and wherein the membrane is configured to be lowered toward the bottom surface of the lower compartment, thereby enabling and constraining cells to grow and align as a two-dimensional culture,
  wherein the lower compartment (12) and the upper compartment (14) have a disc-shaped geometry that enables homogeneous actuation of the membrane (16);
  wherein the diameter of the lower compartment (12) is greater than the height of the lower compartment (12);
  wherein the height of the upper compartment (14) is greater than or equal to the height of the lower compartment (12);
  wherein the diameter of the upper compartment (14), is greater than the width of the upper inlet channel (32) and greater than the width of the upper outlet channel (34);
  wherein the diameter of the lower compartment (12), is greater than the width of the lower inlet channel (26) and greater than the width of the lower outlet channel (28);
  wherein the ratio of the diameter of the lower compartment (12) to the width of the lower inlet channel is from 2 to 5 and the ratio of the diameter of the lower compartment (12) to the width of the lower outlet channel is from 2 to 5; and
  wherein the ratio of the diameter of the lower compartment (12) to the height of the lower compartment (12) is from 15 to 100.

2. The microfluidic device (1a, 1b) of claim 1, wherein the ratio of the thickness of the membrane (16) to the height of the lower compartment (12) is in the range of 0.5 to 1.5.

3. The microfluidic device (1a, 1b) of claim 1, wherein the ratio of the diameter of the upper compartment (14) to the diameter of the lower compartment (12) is in the range of 0.8 to 1.2.

4. The microfluidic device (1a, 1b) of claim 1, wherein the microfluidic device comprises at least two cell culture chambers.

5. The microfluidic device (1a, 1b) of claim 1, wherein the lower compartment (12) has a diameter from 100 µm to 2000 µm.

6. The microfluidic device (1a, 1b) of claim 1, wherein the upper compartment (14) has a diameter from 100 µm to 2000 µm.

7. The microfluidic device (1a, 1b) of claim 1, wherein the lower compartment (12) has a height from 10 µm to 350 µm.

8. The microfluidic device (1a, 1b) of claim 1, wherein the upper compartment (14) has a height of at least 100 µm.

9. The microfluidic device (1a, 1b) of claim 1, wherein the lower compartment (12) has a height from 15 to 60 µm or from 18 to 40 µm, and the upper compartment (14) has a height from 100 µm to 200 µm.

10. The microfluidic device (1a, 1b) of claim 1, wherein the lower compartment (12) has a diameter of 1000 µm and the upper compartment (14) has a diameter of 1100 µm.

11. The microfluidic device (1a, 1b) of claim 1, wherein the lower inlet channel (26) and the lower outlet channel (28) are aligned along a common axis and wherein the upper inlet channel (32) and the upper outlet channel (34) are aligned along a common axis.

12. The microfluidic device (1a, 1b) of claim 11, wherein the common axis of the lower inlet channel (26) and the lower outlet channel (28) is positioned perpendicular to the common axis of the upper inlet channel (32) and the upper outlet channel (34).

13. The microfluidic device (1a, 1b) of claim 1, wherein the membrane (16) has a thickness from 5 to 100 µm.

14. The microfluidic device (1a, 1b) of claim 1, wherein the channels comprised in the lower fluidic network (46) have a uniform width of 20 to 500 µm.

15. The microfluidic device (1a, 1b) of claim 1, wherein the bottom surface of the lower compartment (12) is made of a hydrophilic material.

16. A method for fabricating the microfluidic device (1a, 1b) according to claim 1 comprising:
   a. producing a first element (2), having a first face (2a) and a second face (2b), wherein the second face (2b) comprises a depression, a membrane (16), and at least two grooves connected to the depression, the membrane (16) constituting the bottom of the depression;
   b. producing a second element (4 having a first face (4a) and a second face (4b), wherein the second face (4b) comprises a depression, and at least two grooves connected to the depression
   c. bonding the first face (2a) of the first element (2) and the second face (4b) of the second element (4) together by stacking the second element (4) on top of the first element (2) so as to form (i) the upper compartment (14) having a bottom surface constituted by the membrane (16), and (ii) the upper fluidic network (48) comprising the upper inlet channel (32) and the upper outlet channel (34); and
   d. bonding a third element (20) and the second face (2b) of the first element (2) together so as to form (i) the lower compartment (12) having a bottom surface constituted by the third element (20) and a top surface constituted by the membrane (16) and (ii) the lower fluidic network (46) comprising the lower inlet channel (26) and the lower outlet channel (28).

17. A method for using the microfluidic device (1a, 1b) according to claim 1 for culturing cells, in two dimensions, comprising the steps of:
   a. introducing a cell suspension into the lower compartment (12) to enable seeding of the cells on the bottom surface (22) of the lower compartment (12);
   b. introducing a liquid fluid, into the upper compartment (14);
   c. applying a pressure from 10 to 300 mbar to the upper compartment (14) by maintaining the pressure differential of smaller than or equal to 70 mbar between the upper compartment (14) and the lower compartment (12) so as to lower the center part of the membrane (16) toward the bottom surface (22) of the lower compartment (12) to trap settled cells between the membrane (16) and the bottom surface (22) of the lower compartment (12), creating a two-dimensional cell growth area;
   d. optionally introducing a molecule suspension or solution or a suspension or solution containing molecules to be used as markers of cell compartments or cell features, into the lower compartment (12);
   e. allowing a cell culture medium to circulate through the lower compartment (12); and
   f. observing the cell growth by a microscope through the bottom (30) of the lower compartment (12).

18. A method of assaying a compound on a cell or a cell culture, which comprises the steps of:
   providing a culture of the cell(s), wherein the culture has been carried out in the microfluidic device (1a, 1b) of claim 1, and
   contacting the cell(s) of the culture with the compound.

19. A method of assessing changes in a cell phenotype, or assessing cell normal or abnormal or modified structure, function or status, eell which comprises the steps of:
   providing cells as a cell culture contained in the microfluidic device (1a, 1b) of claim 1,
   optionally introducing a molecule suspension or solution or a suspension or solution containing molecules to be used as markers of cell compartments or cell features, into the lower compartment (12);
   allowing a cell culture medium or molecules of interest to circulate through the lower compartment (12); and
   observing the cell culture to assess the cell phenotype, cell structure, cell function or cell status.

* * * * *